United States Patent
Taniguchi et al.

(10) Patent No.: US 10,954,394 B2
(45) Date of Patent: Mar. 23, 2021

(54) POLYMER-CONTAINING COMPOSITION AND ANTIFOULING COATING COMPOSITION

(71) Applicant: Mitsubishi Chemical Corporation, Chiyoda-ku (JP)

(72) Inventors: Kana Taniguchi, Tokyo (JP); Sho Katsumata, Tokyo (JP); Junichi Nakamura, Tokyo (JP); Nobuaki Kanazawa, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 16 days.

(21) Appl. No.: 16/208,808

(22) Filed: Dec. 4, 2018

(65) Prior Publication Data

US 2019/0100660 A1    Apr. 4, 2019

Related U.S. Application Data

(63) Continuation of application No. PCT/JP2016/085145, filed on Nov. 28, 2016.

(30) Foreign Application Priority Data

Jul. 5, 2016   (JP) .............................. JP2016-133242

(51) Int. Cl.

| | | |
|---|---|---|
| C09D 133/08 | (2006.01) | |
| C09D 5/16 | (2006.01) | |
| C08K 5/55 | (2006.01) | |
| C08L 33/04 | (2006.01) | |
| C08K 3/34 | (2006.01) | |
| C08L 43/00 | (2006.01) | |
| C08K 5/36 | (2006.01) | |
| C09D 133/04 | (2006.01) | |
| C09D 133/00 | (2006.01) | |
| C08K 3/22 | (2006.01) | |
| C09D 133/10 | (2006.01) | |
| C08K 3/015 | (2018.01) | |
| C08K 5/00 | (2006.01) | |
| C08K 5/3472 | (2006.01) | |
| C08K 5/46 | (2006.01) | |
| C08K 5/56 | (2006.01) | |

(52) U.S. Cl.
CPC .............. *C09D 5/1668* (2013.01); *C08K 3/22* (2013.01); *C08K 3/346* (2013.01); *C08K 5/36* (2013.01); *C08K 5/55* (2013.01); *C08L 33/04* (2013.01); *C08L 43/00* (2013.01); *C09D 5/1618* (2013.01); *C09D 5/1625* (2013.01); *C09D 133/00* (2013.01); *C09D 133/04* (2013.01); *C09D 133/08* (2013.01); *C09D 133/10* (2013.01); *C08K 3/015* (2018.01); *C08K 5/0058* (2013.01); *C08K 5/3472* (2013.01); *C08K 5/46* (2013.01); *C08K 5/56* (2013.01); *C08K 2003/2248* (2013.01); *C08K 2003/2296* (2013.01)

(58) Field of Classification Search
CPC .. C09D 5/1668; C09D 5/1625; C09D 133/10; C09D 133/08; C09D 133/02
See application file for complete search history.

(56) References Cited

U.S. PATENT DOCUMENTS

| | | | |
|---|---|---|---|
| 2002/0011177 A1 | 1/2002 | Yamamori et al. | |
| 2013/0058889 A1* | 3/2013 | Iwamoto ............... | C08F 220/18 424/78.09 |
| 2013/0245179 A1 | 9/2013 | Iwamoto et al. | |
| 2016/0168392 A1* | 6/2016 | Masuda ............... | C09D 5/1668 424/78.09 |

FOREIGN PATENT DOCUMENTS

| | | |
|---|---|---|
| CN | 102892844 A | 1/2013 |
| CN | 103221496 A | 7/2013 |
| CN | 105392852 A | 3/2016 |
| EP | 2 557 131 A1 | 2/2013 |
| EP | 2 644 667 A1 | 10/2013 |
| EP | 3 000 857 A1 | 3/2016 |
| JP | 2001-342421 | 12/2001 |
| JP | 2002-241676 | 8/2002 |

(Continued)

OTHER PUBLICATIONS

International Search Report dated Dec. 20, 2016 in PCT/JP2016/085145, filed on Nov. 28, 2016 (with English Translation).
Written Opinion dated Dec. 20, 2016 in PCT/JP2016/085145, filed on Nov. 28, 2016.
Office Action, Notification of Reasons for Refusal, dated Jul. 31, 2018 in JP 2015-095330, filed on Jul. 23, 2018 (with English Translation).
Office Action dated Oct. 30, 2019 in Korean Patent Application No. 10-2018-7036823, citing document AO therein, 9 pages (with machine translation obtained by Global Dossier).
Extended European Search Report dated May 17, 2019 in Patent Application No. 16908210.4, citing documents AO-AQ therein, 6 pages.

(Continued)

*Primary Examiner* — Kuo Liang Peng
(74) *Attorney, Agent, or Firm* — Oblon, McClelland, Maier & Neustadt, L.L.P.

(57) ABSTRACT

Provided is an antifouling coating composition, which can form a coating film having good hardness and good physical properties and having a wear degree appropriate for expressing a long-term antifouling effect, has a viscosity not being excessively high, and makes it possible to reduce a content of volatile organic compounds, and a polymer-containing composition which is suitable for obtaining the antifouling coating composition. The polymer-containing composition contains a (meth)acryl-based copolymer (A-1), in which the (meth)acryl-based copolymer (A-1) contains a constitutional unit (U11) or a constitutional unit (U12) having carboxylate forming an ionic bond with a divalent metal atom, and has a weight-average molecular weight of 1,000 to 5,000, and the polymer-containing composition has a coating film hardness (Martens hardness) equal to or higher than 2.5 N/mm².

17 Claims, No Drawings

(56) References Cited

FOREIGN PATENT DOCUMENTS

| | | |
|---|---|---|
| JP | 2004-256689 | 9/2004 |
| JP | 2011-16958 | 1/2011 |
| JP | 2014-62163 | 4/2014 |
| KR | 10-2013-0045264 A | 5/2013 |
| KR | 10-2016-0008592 | 1/2016 |
| WO | WO 2011/125179 A1 | 10/2011 |
| WO | WO 2011/158358 A1 | 12/2011 |
| WO | WO 2012/070552 A1 | 5/2012 |
| WO | WO 2013/183637 A1 | 12/2013 |
| WO | 2014189069 * | 11/2014 |
| WO | WO 2014/189069 A1 | 11/2014 |

OTHER PUBLICATIONS

Korean Office Action dated Jun. 25, 2020 in Patent Application No. 10-2020-7016044 (with English translation), 7 pages.
Japanese Office Action dated Apr. 7, 2020, in Patent Application No. 2016-573132, 6 pages (with unedited computer generated English translation).
Combined Chinese Office Action and Search Report dated Apr. 7, 2020, in Patent Application No. 201680085738.X, citing documents AO-AQ therein, 16 pages (with unedited computer generated English translation).
Decision of Rejection as received in the corresponding KR patent application No. 10-2020-7016044 dated Oct. 22, 2020 w/Machine translation.
Opposition as received in the corresponding KR Application No. 10-2018-7036823 dated Dec. 23, 2020 w/English Translation (46 pages).

* cited by examiner

POLYMER-CONTAINING COMPOSITION AND ANTIFOULING COATING COMPOSITION

This application is a continuation application of International Application No. PCT/JP2016/085145, filed on Nov. 28, 2016, which claims the benefit of priority of the prior Japanese Patent Application No. 2016-133242, filed in Japan on Jul. 5, 2016, the content of which are incorporated herein by reference.

TECHNICAL FIELD

The present invention relates to a polymer-containing composition and a antifouling coating composition.

BACKGROUND ART

It is known that marine structures or ships are coated with antifouling coating material for the purpose of preventing the adhesion of marine organisms that causes the corrosion of a portion contacting seawater or the decrease in a travelling speed.

As the antifouling coating material, self-polishing type antifouling coating material is known. Typically, the self-polishing type antifouling coating material contains a hydrolyzable resin and an antifouling agent. A coating film obtained from the antifouling coating material undergoes surface renewal (self-polishing) by the gradual dissolution of the surface of the coating film in seawater, and hence the antifouling component is exposed on the surface of the coating film all the time. In this way, the coating film exhibits an antifouling effect over a long period of time.

As the self-polishing type antifouling coating material, for example, antifouling coating material in which a resin composition containing a metal-containing polymer described below is used has been suggested. The resin composition is made into antifouling coating material by being mixed with an antifouling agent and the like. The metal-containing polymer contained in the resin composition has hydrolyzability, and a coating film containing the metal-containing polymer exhibits self-polishing properties.

(1) A metal-containing copolymer for antifouling coating material obtained by polymerizing a mixture of a metal-containing polymerizable monomer and a monomer containing a polymerizable monomer capable of being copolymerized with the metal-containing polymerizable monomer at a temperature equal to or higher than 110° C. in a pressurized container which is pressurized to prevent the reflux of water (PTL 1).

(2) A metal-containing copolymer for antifouling coating material having a molecular weight of 1,000 to 5,000 that is obtained by copolymerizing a mixture of a metal-containing polymerizable monomer and a monomer containing a polymerizable monomer capable of being copolymerized with the metal-containing polymerizable monomer (PTL 2).

(3) A metal-containing copolymer for antifouling coating material containing a constitutional unit derived from a polymerizable monomer which contains a metal and has an alicyclic functional group (PTL 3).

(4) A composition for antifouling coating material containing a polymer which has a unit having a carboxyl group forming an ionic bond with a divalent metal and a polymer which has an acid value less than 20 mgKOH/g (PTL 4).

However, the hardness and the physical properties of coating films formed of the antifouling coating material using the resin compositions of PTL 1 and 2 tend to be insufficient. Furthermore, because the solubility (referred to as wear degree as well) of the coating film is excessively high, the coating film tends to be worn too fast. Therefore, the long-term antifouling effect of the coating film is not necessarily sufficient.

The resin composition of PTL 3 has high viscosity. Therefore, for forming antifouling coating material, it is necessary to reduce the amount of the resin composition mixed so as to reduce the viscosity of the coating material. Accordingly, the long-term wear degree of the coating film, that is, the self-polishing properties of the coating film are poor, and the antifouling effect is not necessarily sufficient. Furthermore, the antifouling coating material formed of the resin composition contains, as a solvent for improving coating properties by reducing viscosity, a large amount of volatile organic compound (hereinafter, referred to as "VOC" as well) which is required to be reduced due to the influence thereof on the environment and the like.

The antifouling coating composition described in PTL 4 also has a problem of high VOC content. In a case where the molecular weight of a resin composition for antifouling coating material which can be incorporated into the composition is reduced, the viscosity of the antifouling coating composition can be lowered, and the VOC content can be reduced. However, in this case, because the viscosity of the resin composition for antifouling coating material is lowered, the hardness of the coating film is excessively reduced. Consequently, water resistance or block properties are affected, and a antifouling coating film which exhibits good durability and antifouling performance over a long period of time tends not to be obtained.

CITATION LIST

Patent Literature

[PTL 1] Japanese Unexamined Patent Application, First Publication No. 2011-16958
[PTL 2] PCT International Publication No. WO2014/189069
[PTL 3] Japanese Unexamined Patent Application, First Publication No. 2002-241676
[PTL 4] PCT International Publication No. WO2013/183637

SUMMARY OF INVENTION

Technical Problem

An object of the present invention is to provide an antifouling coating composition which can form a coating film having good hardness and physical properties and a wear degree appropriate for expressing a long-term antifouling effect, has viscosity that is not excessively high, and makes it possible to reduce a VOC content, and a polymer-containing composition which is suitable for obtaining the antifouling coating composition.

Solution to Problem

The present invention has the following aspects.

[1] A polymer-containing composition containing a (meth)acryl-based copolymer (A-1), in which the (meth)acryl-based copolymer (A-1) contains a constitutional unit (U11) represented by Formula (11) or a constitutional unit (U12) represented by Formula (12) and has a weight-average molecular weight of 1,000 to 5,000, and a coating film hardness of the polymer-containing composition is equal to or higher than 2.5 N/mm².

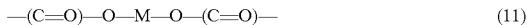  (11)

  (12)

[In the formula, $R^{32}$ represents an organic acid residue, and M represents a divalent metal atom.]

[2] The polymer-containing composition described in [1], in which the (meth)acryl-based copolymer (A-1) has an acid value equal to or higher than 35 mgKOH/g.

[3] The polymer-containing composition described in [2], further containing a vinyl-based polymer (B), in which the vinyl-based polymer (B) has an acid value less than 25 mgKOH/g and has a number-average molecular weight of 2,000 to 20,000.

[4] The polymer-containing composition described in [3], in which a Tg of the vinyl-based polymer (13) is equal to or higher than 20° C.

[5] The polymer-containing composition described in [3] or [4], in which a ratio of the (meth)acryl-based copolymer (A-1):the vinyl-based polymer (B) contained in the polymer-containing composition is 98:2 to 70:30.

[6] The polymer-containing composition described in any one of [1] to [5], in which a solubility parameter of the polymer-containing composition is less than 11.1.

[7] The polymer-containing composition described in any one of [1] to [6], in which the (meth)acryl-based copolymer (A-1) contains a constitutional unit (U3) in addition to the constitutional unit (U11) and the constitutional unit (U12), and the constitutional unit (U3) contains a constitutional unit derived from a monomer (u3-1) having an alicyclic functional group.

[8] The polymer-containing composition described in any one of [1] to [7], in which a constitutional unit whose proportion in the constitutional unit (U3) is equal to or higher than 30% by mass is derived from a monomer having a Tg equal to or higher than 50° C.

[9] A polymer-containing composition containing a (meth)acryl-based copolymer (A-2), in which the (meth)acryl-based copolymer (A-2) contains a constitutional unit (U11) represented by Formula (11) or a constitutional unit (U12) represented by Formula (12) and has a weight-average molecular weight of 1,000 to 5,000, the (meth)acryl-based copolymer (A-2) contains a constitutional unit (U3) in addition to the constitutional unit (U11) and the constitutional unit (U12), the constitutional unit (U3) contains a constitutional unit derived from a monomer (u3-1) having an alicyclic functional group, and a constitutional unit whose proportion in the constitutional unit (U3) is equal to or higher than 30% by mass is derived from a monomer having a Tg equal to or higher than 50° C.

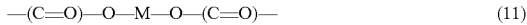  (11)

  (12)

[In the formula, $R^{32}$ represents an organic acid residue, and M represents a divalent metal atom.]

[10] The polymer-containing composition described in any one of [1] to [9] in which a Gardner viscosity of the polymer-containing composition is equal to or lower than Z at a solid content of 55%.

[11] An antifouling coating composition containing the polymer-containing composition described in any one of [1] to [10].

[12] The antifouling coating composition described in [11], further containing an antifouling agent.

[13] The antifouling coating composition described in [12], in which the antifouling agent is one or more compounds selected from the group consisting of cuprous oxide, 4-bromo-2-(4-chlorophenyl)-5-(trifluoromethyl)-1H-pyrrole-3-carbonitrile, pyridine-triphenylborane, zinc pyrithione, copper pyrithione, and medetomidine.

[14] The antifouling coating composition described in any one of [11] to [13] further containing a thermoplastic resin other than the (meth)acryl-based copolymer (A-1), the (meth)acryl-based copolymer (A-2), or the vinyl-based polymer (B).

[15] The antifouling coating composition described in any one of [11] to [14], in which a coating material solid content of the antifouling coating composition is equal to or greater than 60%.

Advantageous Effects of Invention

According to the present invention, it is possible to provide an antifouling coating composition which can form a coating film having good hardness and physical properties and a wear degree appropriate for expressing a long-term antifouling effect, has viscosity that is not excessively high, and makes it possible to reduce a VOC content, and a polymer-containing composition which is suitable for obtaining the antifouling coating composition.

DESCRIPTION OF EMBODIMENTS

Hereinafter, preferable embodiments of the present invention will be described, but the present invention is not limited to the embodiments.

The definitions of the following terms are applied to the present specification and claims.

In the present specification, "(meth)acrylate" is a generic term for acrylate and methacrylate, "(meth)acrylic acid" is a generic term for acrylic acid and methacrylic acid, "(meth)acryloyl group" is a generic term for an acryloyl group and a methacryloyl group, "(meth)acrylonitrile" is a generic term for acrylonitrile and methacrylonitrile, and "(meth)acrylamide" is a generic term for acrylamide and methacrylamide.

"(Meth)acryl-based copolymer" means a copolymer in which at least some of constitutional units are constitutional units derived from a (meth)acryl-based monomer. The (meth)acryl-based copolymer may further have a constitutional unit derived from a monomer (for example, a vinyl-based monomer such as styrehe) other than the (meth)acryl-based monomer.

"(Meth)acryl-based monomer" means a monomer having a (meth)acryloyl group.

"VOC" means an organic compound easily volatilizes at room temperature under normal pressure (volatile organic compound).

[Polymer-Containing Composition]

Hereinafter, a first aspect of the polymer-containing composition of the present invention will be specifically described.

The first aspect of the polymer-containing composition of the present invention contains a (meth)acryl-based copolymer (A-1).

<(Meth)Acryl-Based Copolymer (A-1)>

The (meth)acryl-based copolymer (A-1) contains a constitutional unit (U11) represented by Formula (11) or a constitutional unit (U12) represented by Formula (12) and has a weight-average molecular weight of 1,000 to 5,000.

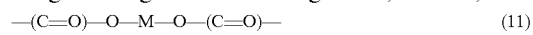  (11)

  (12)

[In the formula, $R^{32}$ represents an organic acid residue, and M represents a divalent metal atom.]

The (meth)acryl-based copolymer (A-1) has a constitutional unit having carboxylate which forming an ionic bond with the divalent metal atom represented by M. Therefore, the (meth)acryl-based copolymer (A-1) expresses self-polishing properties.

As the constitutional unit (U11), a constitutional unit (U1) represented by Formula (1) is preferable. As the constitutional unit (U12), a constitutional unit (U2) represented by Formula (2) is preferable.

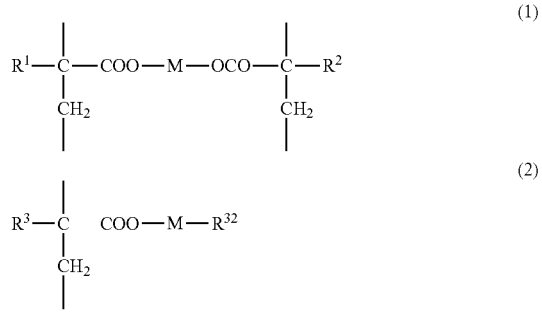

[In the formulae, $R^1$ to $R^3$ each independently represent a hydrogen atom or a methyl group, $R^{32}$ represents an organic acid residue, and M represents a divalent metal atom.]

(Constitutional Unit (U11) and Constitutional Unit (U12))

The (meth)acryl-based copolymer (A-1) may contain one kind of constitutional unit or two or more kinds of constitutional units selected from the constitutional unit (U11) and the constitutional unit (U12).

As the divalent metal atom represented by M in Formula (11) and Formula (1), in view of improving the water resistance of a coating film, Zn, Cu, Mg, or Ca is preferable, and Zn or Cu is more preferable.

Examples of a monomer (u11), from which the constitutional unit (U11) represented by Formula (11) is derived, or a monomer (u1), from which the constitutional unit (U1) represented by Formula (1) is derived, include monomers such as zinc acrylate [(CH$_2$=CHCOO)$_2$Zn], zinc methacrylate [(CH$_2$=C(CH$_3$)COO)$_2$Zn], copper acrylate [(CH$_2$=CHCOO)$_2$Cu], copper methacrylate [CH$_2$=C(CH$_3$)COO)$_2$Cu], magnesium acrylate [(CH$_2$=CHCOO)$_2$Mg], magnesium methacrylate [CH$_2$=C(CH$_3$)COO)$_2$Mg], calcium acrylate [(CH$_2$=CHCOO)$_2$Ca], and calcium methacrylate [(CH$_2$=C(CH$_3$)COO)$_2$Ca].

Among these, in view of the water resistance of the obtained coating film containing the (meth)acryl-based copolymer (A-1), zinc (meth)acrylate and copper (meth)acrylate are preferable.

One kind of any of these monomers may be used singly, or two or more kinds of these monomers may be used in combination.

As the divalent metal atom represented by M in Formula (12) and Formula (2), in view of improving the water resistance of the coating film, Zn or Cu is preferable.

The organic acid residue represented by $R^{32}$ refers to a portion of an organic acid that remains after one proton is removed from the organic acid (for example, a portion of an organic carboxylic acid that remains after a proton of a carboxyl group in the organic carboxylic acid is removed). The atom, to which the removed proton was bonded, of the remaining portion of the organic acid forms an ionic bond with the divalent metal atom represented by M.

As the organic acid, a carboxylic acid is preferable. Examples thereof include monocarboxylic acids such as monochloroacetic acid, monofluoroacetic acid, acetic acid, propionic acid, octylic acid, versatic acid, isostearic acid, palmitic acid, cresotic acid, α-naphthoic acid, β-naphthoic acid, benzoic acid, 2,4,5-trichlorophenoxyacetic acid, 2,4-dichlorophenoxyacetic acid, quinoline carboxylic acid, nitrobenzoic acid, nitronaphthalene carboxylic acid, pyruvic acid, naphthenic acid, abietic acid, and hydrogenated abietic acid, and the like.

Among these, in view of obtaining a coating film having high durability that can prevent the coating film from being cracked or peeled over a long period of time, a fatty acid having 1 to 20 carbon atoms (aliphatic monocarboxylic acid) is preferable.

Examples of a monomer (u12), from which the constitutional unit (U12) represented by Formula (12) is derived, or a monomer (u2), from which the constitutional unit (U2) represented by Formula (2) is derived, include monochloroacetic acid metal (meth)acrylate such as monochloroacetic acid magnesium (meth)acrylate, monochloroacetic acid calcium (meth)acrylate, monochloroacetic acid zinc (meth)acrylate, and monochloroacetic acid copper (meth)acrylate; monofluoroacetic acid metal (meth)acrylate such as monofluoroacetic acid magnesium (meth)acrylate, monofluoroacetic acid calcium (meth)acrylate, monofluoroacetic acid zinc (meth)acrylate, and monofluoroacetic acid copper (meth)acrylate; acetic acid metal (meth)acrylate such as acetic acid magnesium (meth)acrylate, acetic acid calcium (meth)acrylate, acetic acid zinc (meth)acrylate, and acetic acid copper (meth)acrylate; propionic acid metal (meth)acrylate such as propionic acid magnesium (meth)acrylate, propionic acid calcium (meth)acrylate, propionic acid zinc (meth)acrylate, and propionic acid copper (meth)acrylate; octylic acid metal (meth)acrylate such as octylic acid magnesium (meth)acrylate, octylic acid calcium (meth)acrylate, octylic acid zinc (meth)acrylate, and octylic acid copper (meth)acrylate; versatic acid metal (meth)acrylate such as versatic acid magnesium (meth)acrylate, versatic acid calcium (meth)acrylate, versatic acid zinc (meth)acrylate, and versatic acid copper (meth)acrylate; isostearic acid metal (meth)acrylate such as isostearic acid magnesium (meth)acrylate, isostearic acid calcium (meth)acrylate, isostearic acid zinc (meth)acrylate, and isostearic acid copper (meth)acrylate; palmitic acid metal (meth)acrylate such as palmitic acid magnesium (meth)acrylate, palmitic acid calcium (meth)acrylate, palmitic acid zinc (meth)acrylate, and palmitic acid copper (meth)acrylate; cresotic acid metal (meth)acrylate such as cresotic acid magnesium (meth)acrylate, cresotic acid calcium (meth)acrylate, cresotic acid zinc (meth)acrylate, and cresotic acid copper (meth)acrylate; α-naphthoic acid metal (meth)acrylate such as α-naphthoic acid magnesium (meth)acrylate, α-naphthoic acid calcium (meth)acrylate, α-naphthoic acid zinc (meth)acrylate, and α-naphthoic acid copper (meth)acrylate; β-naphthoic acid metal (meth)acrylate such as β-naphthoic acid magnesium (meth)acrylate, β-naphthoic acid calcium (meth)acrylate, β-naphthoic acid zinc (meth)acrylate, and β-naphthoic acid copper (meth)acrylate; benzoic acid metal (meth)acrylate such as benzoic acid magnesium (meth)acrylate, benzoic acid calcium (meth)acrylate, benzoic acid zinc (meth)acrylate, and benzoic acid copper (meth)acrylate; 2,4,5-trichlorophenoxyacetic acid metal (meth)acrylate such as 2,4,5-trichlorophenoxyacetic acid magnesium (meth)acrylate, 2,4,5-trichlorophenoxyacetic acid calcium (meth)acrylate, 2,4, 5-trichlorophenoxyacetic acid zinc (meth)acrylate, and 2,4,5-trichlorophenoxyacetic acid copper (meth)acrylate; 2,4-dichlorophenoxyacetic acid metal (meth)acrylate such as 2,4-dichlorophenoxyacetic acid magnesium (meth)acrylate, 2,4-dichlorophenoxyacetic acid calcium (meth)acrylate, 2,4-dichlorophenoxyacetic acid zinc (meth)acrylate, and 2,4-dichlorophenoxyacetic acid copper (meth)acrylate; quinoline carboxylic acid metal (meth)acrylate such as quinoline carboxylic acid magnesium (meth)acrylate, quinoline carboxylic acid calcium (meth)acrylate, quinoline carboxylic acid zinc (meth)acrylate, and quinoline carboxylic acid copper (meth)acrylate; nitrobenzoic acid metal (meth)acrylate such as nitrobenzoic acid magnesium (meth)acrylate, nitrobenzoic acid calcium (meth)acrylate, nitrobenzoic acid zinc (meth)acrylate, and nitrobenzoic acid copper (meth)acrylate; nitronaphthalene carboxylic acid metal (meth)acrylate such as nitronaphthalene carboxylic acid magnesium (meth)acrylate, nitronaphthalene carboxylic acid calcium (meth)acrylate, nitronaphthalene carboxylic acid zinc (meth)acrylate, and nitronaphthalene carboxylic acid copper (meth)acrylate; pyruvic acid metal (meth)acrylate such as pyruvic acid magnesium (meth)acrylate, pyruvic acid calcium (meth)acrylate, pyruvic acid zinc (meth)acrylate, and pyruvic acid copper (meth)acrylate; and the like.

Among these, in view of the water resistance of the obtained coating film containing the copolymer (A-1), a monomer in which the divalent metal atom represented by M is zinc or copper is preferable.

One kind of any these monomers may be used singly, or two or more kinds of these monomers may be used in combination.

The (meth)acryl-based copolymer (A-1) can contain both the constitutional unit (U11) and the constitutional unit (U12). That is, the (meth)acryl-based copolymer (A-1) can have a constitutional unit derived from the monomer (u11) and a constitutional unit derived from the monomer (u12).

In a case where the (meth)acryl-based copolymer (A-1) contains both the constitutional unit (U11) and the constitutional unit (U12), in the (meth)acryl-based copolymer (A-1), a ratio (molar ratio) between the constitutional unit (U11) derived from the monomer (u11) and the constitutional unit (U12) derived from the monomer (u12), represented by constitutional unit (U11)/constitutional unit (U12), is preferably 10/90 to 90/10, more preferably 20/80 to 80/20, and even more preferably 30/70 to 70/30.

In a case where the ratio is equal to or lower than the upper limit described above, the viscosity of the polymer composition containing the (meth)acryl-based copolymer (A-1) tends to be reduced. In a case where the ratio is equal to or higher than the lower limit described above, the self-polishing properties of the coating film tend to last over a long period of time.

Hereinafter, the monomer (u11) and the monomer (u12) will be collectively referred to as metal-containing polymerizable monomer (u) in some cases.

(Constitutional Unit (U3))

It is preferable that the (meth)acryl-based copolymer (A-1) further contains a constitutional unit (U3) in addition to the constitutional unit (U11) and the constitutional unit (U12). The constitutional unit (U3) may be one kind of constitutional unit derived from one kind of monomer or two or more kinds of constitutional units derived from two or more kinds of monomers.

A monomer (u3) from which the constitutional unit (U3) is derived is not particularly limited as long as the monomer can be copolymerized with the monomer (u11) from which the constitutional unit (U11) is derived and the monomer (u12) from which the constitutional unit (U12) is derived. Examples of the monomer (u3) include a hydrophobic group-containing (meth)acrylic acid ester monomer such as substituted or unsubstituted alkyl (meth)acrylate [for example, methyl (meth)acrylate, ethyl (meth)acrylate, n-propyl (meth)acrylate, i-propyl (meth)acrylate, n-butyl (meth)acrylate, i-butyl (meth) acrylate, t-butyl (meth)acrylate, 2-ethylhexyl (meth)acrylate, lauryl (meth)acrylate, stearyl (meth)acrylate, behenyl (meth)acrylate, 1-methyl-2-methoxyethyl (meth)acrylate, 2-methoxyethyl (meth)acrylate, 3-methoxybutyl (meth)acrylate, or 3-methyl-3-methoxybutyl (meth)acrylate], substituted or unsubstituted aralkyl (meth)acrylate [for example, benzyl (meth)acrylate, m-methoxyphenyl ethyl (meth)acrylate, or p-methoxyphenyl ethyl (meth)acrylate], substituted or unsubstituted aryl (meth)acrylate [for example, phenyl (meth)acrylate, m-methoxyphenyl (meth)acrylate, p-methoxyphenyl (meth)acrylate, or o-methoxyphenyl (meth)acrylate], or substituted or unsubstituted alicyclic (meth)acrylate [for example, isobornyl (meth)acrylate, cyclohexyl (meth)acrylate, trifluoroethyl (meth)acrylate, perfluorooctyl (meth)acrylate, or perfluorocyclohexyl (meth)acrylate]; an oxyethylene group-containing (meth)acrylic acid ester monomer such as 2-methoxyethyl (meth)acrylate, 2-ethoxyethyl (meth)acrylate, 2-butoxyethyl (meth)acrylate, butoxydiethylene glycol (meth)acrylate, methoxytriethylene glycol (meth)acrylate, methoxypolyethylene glycol (meth)acrylate, phenoxyethyl (meth)acrylate, or 2-(2-ethylhexoxy)ethyl (meth)acrylate; a hydroxyl group-containing (meth)acrylic acid ester monomer such as 2-hydroxyethyl (meth)acrylate, 2-hydroxypropyl (meth)acrylate, 4-hydroxybutyl (meth)acrylate, or glycerol (meth)acrylate; a polyether monomer having an alkoxyallylated terminal such as methoxypolyethylene glycol allyl ether, methoxypolypropylene glycol allyl ether, butoxypolyethylene glycol allyl ether, butoxypolypropylene glycol allyl ether, methoxypolyethylene glycol-polypropylene glycol allyl ether, or butoxypolyethylene glycol-polypropylene glycol allyl ether; an epoxy group-containing vinyl monomer such as glycidyl (meth)acrylate, α-ethyl glycidyl acrylate, or 3,4-epoxybutyl (meth)acrylate; a vinyl monomer containing a primary or secondary amino group such as butyl aminoethyl (meth)acrylate or (meth)acrylamide; a tertiary amino group-containing vinyl monomer such as dimethylaminoethyl (meth)acrylate, diethylaminoethyl (meth)acrylate, dimethylaminopropyl (meth)acrylate, dimethylaminobutyl (meth)acrylate, dibutylaminoethyl (meth)acrylate, dimethylaminoethyl (meth)acrylate, or dimethylaminopropyl (meth)acrylate; a heterocyclic basic monomer such as vinyl pyrrolidone, vinyl pyridine, or vinyl carbazole; an organosilyl group-containing vinyl monomer such as trimethylsilyl (meth)acrylatc, triethylsilyl (meth)acrylate, tri-n-propylsilyl (meth)acrylate, tri-n-butylsilyl (meth)acrylate, tri-n-amylsilyl (meth)acrylate, tri-n-hexylsilyl (meth)acrylate, tri-n-octylsilyl (meth)acrylate, tri-n-dodecylsilyl (meth)acrylate, triphenylsilyl (meth)acrylate, tri-p-methylphenylsilyl (meth)acrylate, tribenzylsilyl (meth)acrylate, triisopropylsilyl (meth)acrylate, triisobutylsilyl (meth)acrylate, tri-s-butylsilyl (meth)acrylate, tri-2-methylisopropylsilyl (meth)acrylate, tri-t-butylsilyl (meth)acrylate, ethyldimethylsilyl (meth)acrylate, n-butyldimethylsilyl (meth)acrylate, diisopropyl-n-butylsilyl (meth)acrylate, n-octyl di-n-butylsilyl (meth)acrylate, diisopropylstearylsilyl (meth)acrylate, dicyclohexylphenylsilyl (meth)acrylate, t-butyldiphenylsilyl (meth)acrylate, lauryldiphenylsilyl (meth)acrylate, triisopropylsilylmethyl maleate, triisopropylsilylamyl maleate, tri-n-butylsilyl-n-butyl maleate, t-butyldiphenylsilylmethyl maleate, t-butyldiphenylsilyl-n-butyl maleate, triisopropylsilylmethyl fumarate, triisopropylsilylamyl fumarate, tri-n-butylsilyl-n-butyl fumarate, t-butyldiphenylsilylmethyl fumarate, or t-butyldiphenylsilyl-n-butyl fumarate; an acid anhydride group-containing vinyl monomer such as maleic anhydride or itaconic anhydride; a carboxy group-containing ethylenically unsaturated monomer such as methacrylic acid, acrylic acid, crotonic acid, vinyl benzoic acid, fumaric acid, itaconic acid, maleic acid, citraconic acid, monomethyl maleate, monoethyl maleate, monobutyl maleate, monooctyl maleate, monomethyl itaconate, monoethyl itaconate, monobutyl itaconate, monooctyl itaconate, monomethyl fumarate, monoethyl fumarate, monobutyl fumarate, monooctyl fumarate, monoethyl citraconate, tetrahydrophthalic acid monohydroxyethyl (meth)acrylate, tetrahydroxyphthalic acid monohydroxypropyl (meth)acrylate, tetrahydroxyphthalic acid monohydroxybutyl (meth)acrylate, phthalic acid monohydroxyethyl (meth)acrylate, phthalic acid monohydroxypropyl (meth)acrylate, succinic acid monohydroxyethyl (meth)acrylate, succinic acid monohydroxypropyl (meth)acrylate, maleic acid monohydroxyethyl (meth)acrylate, or maleic acid monohydroxypropyl (meth)acrylate; an unsaturated dicarboxylic acid diester monomer such as dimethyl maleate, dibutyl maleate, dimethyl fumarate, dibutyl fumarate, dibutyl itaconate, or diperfluorocyclohexyl fumarate; a cyano group-containing vinyl monomer such as acrylonitrile or methacrylonitrile; a vinyl ether monomer such as alkyl vinyl ether [for example, ethyl vinyl ether, propyl vinyl ether, dibutyl vinyl ether, hexyl vinyl ether, or 2-ethylhexylvinyl ether] or cycloalkyl vinyl ether [for example, cyclohexyl vinyl ether]; a vinyl ester monomer such as vinyl acetate, vinyl propionate, vinyl butyrate, or vinyl benzoate; an aromatic vinyl monomer such as styrene, vinyl toluene, or α-methylstyrene; a halogenated olefin such as vinyl chloride, vinylidene chloride, vinyl fluoride, vinylidene fluoride, or chlorotrifluoroethylene; a polyfunctional monomer such as ethylene glycol di(meth)acrylate, diethylene glycol di(meth)acrylate, triethylene glycol di(meth)acrylate, polyethylene glycol di(meth)acrylate, 1,4-butanediol di(meth)acrylate, 1,6-hexanediol di(meth)acrylate, neopentyl glycol di(meth)acrylate, 1,9-nonanediol di(meth) acrylate, 1,10-decanediol di(meth)acrylate, trimethylolpropane tri(meth)acrylate, pentaerythritol tetra(meth)acrylate, dipentaerythritol hexa(meth)acrylate, allyl methacrylate, triallyl cyanurate, diallyl maleate, or polypropylene glycol diallyl ether; and the like.

Among these, a monofunctional monomer having one ethylenically unsaturated bond is preferable, because this monomer makes it easy to reduce viscosity even though the solid content of the (meth)acryl-based copolymer (A-1) is high.

One kind of these monomers or two or more kinds of these monomers can be used by being appropriately selected as necessary.

It is preferable that the constitutional unit (U3) contains a constitutional unit derived from a monomer (u3-1) having a substituted or unsubstituted alicyclic functional group, because then the physical properties or the water resistance of the coating film containing the (meth)acryl-based copolymer (A-1) and the long-term self-polishing properties of the coating film in a low-molecular weight range can be improved in a well-balanced way.

In a case where the constitutional unit (U3) contains the monomer (u3-1) having a substituted or unsubstituted alicyclic functional group, the content of the monomer (u3-1) in the total mass (100% by mass) of the monomer (u3) from which the constitutional unit (U3) is derived is preferably 2% to 50% by mass, more preferably 5% to 40% by mass, and even more preferably 10% to 35% by mass.

Furthermore, in order to improve block properties, a constitutional unit whose proportion in the total mass (100% by mass) of the constitutional unit (U3) is equal to or higher than 30% by mass, preferably 35% to 90% by mass, and more preferably 40% to 80% by mass is preferably derived from a monomer having a Tg equal to or higher than 50° C.

Examples of the monomer having a Tg equal to or higher than 50° C. in the polymerizable monomers from which the constitutional unit (U3) is derived include polymerizable monomers described in POLYMER HANDBOOK FOURTH EDITION, which will be described later, including a hydrophobic group-containing methacrylic acid ester monomer such as substituted or unsubstituted alkyl methacrylate [for example, methyl methacrylate, ethyl methacrylate, i-butyl methacrylate, or t-butyl methacrylate], benzyl methacrylate, phenyl methacrylate, substituted or unsubstituted alicyclic (meth)acrylate [for example, isobornyl methacrylate, cyclohexyl methacrylate, or isobornyl acrylate], perfluorooctyl methacrylate, or perfluorocyclohexyl methacrylate; a hydroxyl group-containing (meth)acrylic acid ester monomer such as 2-hydroxyethyl methacrylate or 2-hydroxypropyl methacrylate; and styrene.

Among these, in view of water resistance and copolymerization properties, substituted or unsubstituted alkyl methacrylate and substituted and unsubstituted alicyclic (meth)acrylate are preferable.

One kind of these monomers or two or more kinds of these monomers can be used by being appropriately selected as necessary.

(Content of each Constitutional Unit)

In the (meth)acryl-based copolymer (A-1), the total content of the constitutional unit (U11) and the constitutional unit (U12) with respect to the total amount (100% by mass) of all the constitutional units is preferably 1% to 40% by mass, and more preferably 5% to 30% by mass.

In a case where the total content of the constitutional unit (U11) and the constitutional unit (U12) is equal to or greater than the lower limit described above, the long-term self-polishing properties of the prepared coating film containing the (meth)acryl-based copolymer (A-1) are further improved. In a case where the total content of the constitutional unit (U11) and the constitutional unit (U12) is equal to or smaller than the upper limit described above, the storage stability of the polymer-containing composition or an antifouling coating composition containing the polymer-containing composition, the adhesiveness of the formed coating film, the water resistance of the coating film in seawater, and the balance between the hardness and the crack resistance of the coating film tend to be improved.

In the (meth)acryl-based copolymer (A-1), the content of the constitutional unit (U3) with respect to the total amount (100% by mass) of all the constitutional units is preferably 60% to 99% by mass, and more preferably 70% to 95% by mass. In a case where the content of the constitutional unit (U3) is equal to or greater than the lower limit described above, the hardness of the coating film to be formed and the water resistance and adhesiveness of the coating film in the seawater are further improved. In a case where the content of the constitutional unit (U3) is equal to or smaller than the upper limit described above, the storage stability of the polymer-containing composition or an antifouling coating composition containing the polymer-containing composition is further improved.

In a case where the (meth)acryl-based copolymer (A-1) contains a constitutional unit derived from the monomer (u3-1) having a substituted or unsubstituted alicyclic functional group, in the (meth)acryl-based copolymer (A-1), the content of constitutional unit derived from the monomer unit (u3-1) with respect to the total amount (100% by mass) of all the constitutional units is preferably 2% to 40% by mass, and more preferably 5% to 30% by mass.

In a case where the content of the constitutional unit derived from the monomer (u3-1) is equal to or greater than the lower limit described above, the water resistance and the self-polishing properties in a low-molecular weight range can be improved in a well-balanced way. In a case where the content of the constitutional unit derived from the monomer (u3-1) is equal to or smaller than the upper limit described above, the self-polishing properties become sufficient, and the antifouling performance becomes preferable.

The sum of the total content of the constitutional unit (U11) and the constitutional unit (U12) and the content of the constitutional unit (U3) with respect to the total amount (100% by mass) of all the constitutional units is 100% by mass.

The content (% by mass) of each of the constitutional units in the copolymer (A) can be measured by a known method such as gas chromatography, high performance liquid chromatography, or nuclear magnetic resonance spectroscopy.

(Characteristics of (Meth)Acryl-Based Copolymer (A-1))

The weight-average molecular weight (Mw) of the (meth)acryl-based copolymer (A-1) is 1,000 to 5,000, and more preferably 1,500 to 4,600.

In a case where the weight-average molecular weight of the (meth)acryl-based copolymer (A-1) is equal to or smaller than the upper limit described above, it is easy to obtain a polymer-containing composition or an antifouling coating composition which has a high solid content but exhibits low viscosity. Accordingly, it is easy to obtain a polymer-containing composition or an antifouling coating composition which has a high coating material solid content and contains a small amount of VOC as a solvent that is required to be reduced due to the influence thereof on the environment and the like. Furthermore, in a case where the weight-average molecular weight of the (meth)acryl-based copolymer (A-1) is equal to or smaller than the upper limit described above, the antifouling properties of the formed coating film become preferable.

In a case where the weight-average molecular weight of the (meth)acryl-based copolymer (A-1) is equal to or greater than the lower limit described above, the hardness and the durability of the formed coating film are further improved.

The number-average molecular weight (Mn) of the (meth)acryl-based copolymer (A-1) is preferably 500 to 2,500, and more preferably 750 to 2,000.

The polydispersity (Mw/Mn) of the (meth)acryl-based copolymer (A-1) is preferably 1.5 to 5.0, and more preferably 2.2 to 3.0.

Each of the weight-average molecular weight (Mw) and the number-average molecular weight (Mn) of the (meth)acryl-based copolymer (A-1) is measured by gel permeation chromatography (GPC) by using polystyrene as a standard resin.

The acid value of the (meth)acryl-based copolymer (A-1) is preferably equal to or higher than 35 mgKOH/g, more preferably 40 to 180 mgKOH/g, and even more preferably 50 to 120 mgKOH/g.

In a case where the acid value of the (meth)acryl-based copolymer (A-1) is equal to or higher than the lower limit described above, the optimal wear degree tends to be obtained. In a case where the acid value of the (meth)acryl-based copolymer (A-1) is equal to or lower than the upper limit described above, water resistance tends to become preferable.

The acid value of the (meth)acryl-based copolymer (A-1) is calculated as below.

A measurement sample (about 0.5 g) is weighed and put into a beaker (A (g)), and 50 mL of toluene/95% ethanol solution is added thereto. A few drops of phenolphthalein is added thereto, and titration is performed using a 0.5 M potassium hydroxide solution (titration amount=B (mL), titer of potassium hydroxide solution=f). Blank measurement is performed in the same manner as described above (titration amount=C (mL)), and the acid value is calculated according to the following formula.

$$\text{Acid value (mgKOH/g)} = \{(B-C) \times 0.2 \times 56.11 \times f\}/A/\text{solid content}$$

The first aspect of the polymer-containing composition of the present invention may contain one kind of (meth)acryl-based copolymer (A-1) or two or more kinds of (meth)acryl-based copolymers (A-1).

In the first aspect of the polymer-containing composition of the present invention, the content of the (meth)acryl-based copolymer (A-1) with respect to the total amount (100% by mass) of the polymer-containing composition is preferably equal to or smaller than 85% by mass, more preferably 10% to 80% by mass, even more preferably 30 to 75% by mass, and particularly preferably 55 to 75% by mass. In a case where the content of the (meth)acryl-based copolymer (A-1) in the polymer-containing composition is equal to or smaller than the upper limit described above, it is possible to obtain a coating film having good water resistance, good hardness, and the like. In a case where the content of the (meth)acryl-based copolymer (A-1) in the polymer-containing composition is equal to or greater than the lower limit described above, it is possible to easily obtain an antifouling coating composition with a small VOC content.

(Manufacturing Method of (Meth)Acryl-Based Copolymer (A-1))

Examples of the manufacturing method of the (meth)acryl-based copolymer (A-1) include known methods including a method 1 and a method 2 described below.

(Method 1) Method of copolymerizing mixture of monomers including metal-containing polymerizable monomer.

(Method 2) Method of adding metal to resin of high acid value.

The method 1 is a manufacturing process in which either or both of the monomer (u11) and the monomer (u12) are copolymerized with, if necessary, the monomer (u3) by a known method.

The method 2 is a manufacturing process in which a mixture of monomers including a polymerizable monomer containing a carboxyl group is polymerized by a known method and then reacted with a metal oxide such as zinc oxide.

Among these, it is preferable to use the method 1 for manufacturing the (meth)acryl-based copolymer (A-1), because then the coating material containing the (meth)acryl-based copolymer (A-1) has good storage stability, and the antifouling coating film obtained from the coating material can stably maintain the self-polishing properties over a long period of time.

In the method 1 and the method 2, it is possible to use known polymerization methods such as a solution polymerization method, a suspension polymerization method, a bulk polymerization method, and an emulsion polymerization method. In view of productivity and coating performance, a solution polymerization method is preferable in some cases.

Monomer

The polymerizable monomers used for manufacturing the (meth)acryl-based copolymer (A-1) may be polymerizable monomers manufactured by known methods or commercial polymerizable monomers.

The monomer (u11) is obtained by, for example, a method in which an inorganic metal compound containing a metal element corresponding to M in Formula (11) is reacted with a polymerizable monomer containing a carboxylic acid such as (meth)acrylic acid in a diluent such as a solvent or in a reactive diluent having a polymerizable unsaturated group such as an ethylenically unsaturated monomer. A mixture containing the monomer (u11) obtained by this method is compatible with a solvent or other monomers and can easily cause polymerization.

It is preferable that the reaction for obtaining the monomer (u11) is performed in the presence of water. The content of water in the reactant is preferably within a range of 0.01% to 30% by mass.

Examples of the inorganic metal compound include an oxide, a hydroxide, and a chloride of a metal selected from Zn, Cu, Mg, and Ca, and the like.

The monomer (u12) is obtained by, for example, a method in which an inorganic metal compound containing a metal atom corresponding to M in Formula (12), a polymerizable monomer containing a carboxylic acid such as (meth)acrylic acid, and an organic acid corresponding to the organic acid residue $R^{32}$ in Formula (12) are reacted with each other in a diluent such as a solvent or in a reactive diluent having a polymerizable unsaturated group such as an ethylenically unsaturated monomer.

Examples of the inorganic metal compound are the same as the examples of the inorganic metal compound for obtaining the monomer (u11).

The mixture of monomers containing the monomer (u11) and the monomer (u12) is obtained by a method in which an inorganic metal compound containing metal elements corresponding to M in Formula (11) and Formula (12), a polymerizable monomer containing a carboxylic acid such as (meth)acrylic acid, and an organic acid corresponding to the organic acid residue $R^{32}$ in Formula (12) are reacted with each other in a diluent such as a solvent or in a reactive diluent having a polymerizable unsaturated group such as an ethylenically unsaturated monomer.

At this time, the amount of the organic acid used that corresponds to the organic acid residue $R^{32}$ in Formula (12) is, based on mole, preferably 1% to 300% of the amount of the inorganic metal compounds, more preferably 1% to 95% of the amount of the inorganic metal compounds, and even more preferably 10% to 70% of the amount of the inorganic metal compounds.

In a case where the amount of the organic acid used that corresponds to the organic acid residue $R^{32}$ in Formula (12) is equal to or greater than the lower limit described above, the precipitation of solids is inhibited in the manufacturing process of the mixture of the monomers containing the monomer (u11) and the monomer (u12), and the self-polishing properties and the crack resistance of the obtained coating film are further improved. In a case where the amount of the organic acid used that corresponds to the organic acid residue $R^{32}$ in Formula (12) is equal to or smaller than the upper limit described above, the antifouling properties of the obtained coating film tend to last over a longer period of time.

Solvent

Examples of the solvent used for polymerization or copolymerization or used for dilution at the time of reaction include solvents which will be described later as a solvent (S) that can be contained in the polymer-containing composition. It is preferable that the solvent contains alcohols, because then the stability at the time of manufacturing the (meth)acryl-based copolymer (A-1) becomes preferable.

The solvent used for polymerization or copolymerization and the solvent used for dilution at the time of reaction may be the same as or different from each other.

Polymerization or Copolymerization

The polymerization or the copolymerization may be performed by a known method by using a known polymerization initiator. For example, the polymerization or the copolymerization is performed by a method in which a mixture of monomers including the monomer (u11) and/or the monomer (u12) and the monomer (u3), which is used if necessary, is reacted for 2 to 14 hours in a solvent in the presence of a radical polymerization initiator at a reaction temperature of 60° C. to 180° C. At this time, if necessary, a chain transfer agent may also be used.

Radical Polymerization Initiator

As the radical polymerization initiator, known compounds can be used. Examples thereof include an azo-based compound such as 2,2-azobisisobutyronitrile, 2,2-azobis(2,4-dimethylvaleronitrile), or 2,2-azobis(2-methylbutyronitrile); an organic peroxide such as lauryl peroxide, benzoyl peroxide, cumene hydroperoxide, di-t-butyl peroxide, t-butyl peroxy-2-ethylhexyanoate, or t-butyl peroctoate; and the like.

The content of the polymerization initiator is not particularly limited and can be appropriately set.

Chain Transfer Agent

As the chain transfer agent, known compounds can be used. Examples thereof include mercaptans such as n-dodecyl mercaptan, a cobalt chain transfer agent, thioglycolic acid esters such as octyl thioglycolate, an α-methylstyrene dimer, terpinolene, and the like.

The content of the chain transfer agent is not particularly limited and can be appropriately set.

<Vinyl-Based Polymer (B)>

The first aspect of the polymer-containing composition of the present invention may contain the vinyl-based polymer (B) in addition to the (meth)acryl-based copolymer (A-1).

The acid value of the vinyl-based polymer (B) is less than 25 mgKOH/g. The number-average molecular weight (Mn) of the vinyl-based polymer (B) is 2,000 to 20,000. The vinyl-based polymer (B) is a polymer different from the (meth)acryl-based copolymer (A-1).

The acid value of the vinyl-based polymer (B) is less than 25 mgKOH/g, preferably less than 20 mgKOH/g, more preferably equal to or lower than 15 mgKOH/g, and even more preferably equal to or lower than 10 mgKOH/g.

In a case where the acid value of the vinyl-based polymer (B) is equal to or lower than the upper limit described above, the water resistance becomes preferable, the coating film hardness becomes sufficient, and the durability and the antifouling properties last over a long period of time.

The acid value of the vinyl-based polymer (B) is measured by the same method as that used for measuring the acid value of the (meth)acryl-based copolymer (A-1).

The number-average molecular weight (Mn) of the vinyl-based polymer (B) is 2,000 to 20,000, preferably 2,500 to 10,000, and more preferably 3,000 to 8,000.

In a case where the number-average molecular weight (Mn) of the vinyl-based polymer (B) is equal to or greater than the lower limit described above, the self-polishing properties and the hardness of the coating film become preferable. In a case where the number-average molecular weight of the vinyl-based polymer (B) is equal to or smaller than the upper limit described above, the VOC content can be reduced.

The Tg of the vinyl-based polymer (B) is preferably equal to or higher than 20° C., and more preferably equal to or higher than 35° C. Furthermore, the Tg of the vinyl-based polymer (B) is preferably equal to or lower than 120° C., and more preferably equal to or lower than 105° C. That is, the Tg of the vinyl-based polymer (B) is preferably equal to or higher than 20° C. and equal to or lower than 120° C., and more preferably equal to or higher than 35° C. and equal to or lower than 105° C.

In a case where the Tg of the vinyl-based polymer (B) is within the above range, the hardness or the water resistance of the coating film tends to be improved.

The Tg (glass transition temperature) is a value obtained by converting an absolute temperature (K) calculated by Formula (I) into Celsius (° C.).

$$1/Tg=\Sigma(w_i/Tg_i) \qquad (I)$$

In Formula (1), $w_i$ represents a mass fraction of an ethylenically unsaturated monomer i from which the constitutional unit of the vinyl-based polymer (B) is derived, and $Tg_i$ represents a glass transition temperature of a polymer, that is, a homopolymer of the ethylenically unsaturated monomer i from which the constitutional unit of the vinyl-based polymer (B) is derived. The Tg and the $Tg_i$ in Formula (1) are values represented by the absolute temperature (K). As the $Tg_i$, the value described in "POLYMER HANDBOOK, FOURTH EDITION, J. Brandrup et al., V1/p. 193-253" is used.

In an aspect, the vinyl-based polymer (B) has, as a constitutional unit, the constitutional unit (U3) described regarding the (meth)acryl-based copolymer (A-1). The vinyl-based polymer (B) may contain one kind of constitutional unit derived from one kind of polymerizable monomer or contain two or more kinds of constitutional units derived from two or more kinds of polymerizable monomers.

In another aspect, the vinyl-based polymer (B) can be obtained by polymerizing or copolymerizing one kind of polymerizable monomer or two or more kinds of polymerizable monomers selected from the following ethylenically unsaturated monomers. Examples of the ethylenically unsaturated monomers include a (meth)acrylic acid ester such as methyl (meth)acrylate, ethyl (meth)acrylate, n-butyl (meth)acrylate, i-butyl (meth)acrylate, t-butyl (meth)acrylate, 2-ethylhexyl (meth)acrylate, n-lauryl (meth)acrylate, n-stearyl (meth)acrylate, cyclohexyl (meth)acrylate, phenyl (meth)acrylate, benzyl (meth)acrylate, isobornyl (meth) acrylate, 2-methoxyethyl (meth)acrylate, 2-ethoxyethyl (meth)acrylate, or phenoxyethyl (meth)acrylate; a hydroxyl group-containing (meth)acrylic acid ester such as 2-hydroxyethyl (meth)acrylate, 2-hydroxypropyl (meth)acrylate, 4-hydroxybutyl (meth)acrylate, or glycerol (meth)acrylate; a carboxyl group-containing vinyl-based monomer such as (meth)acrylic acid, 2-(meth)acryloyloxyethyl hexahydrophthalate, 2-(meth)acryloyloxypropyl hexahydrophthalate, 2-(meth)acryloyloxyethyl phthalate, 2-(meth)acryloyloxypropyl phthalate, 2-(meth)acryloyloxyethyl maleate, 2-(meth)acryloyloxypropyl maleate, 2-(meth)acryloyloxyethyl succinate, 2-(meth)acryloyloxypropyl succinate, crotonic acid, fumaric acid, maleic acid, itaconic acid, monomethyl maleate, or monomethyl itaconate; a vinyl-based monomer containing an acid anhydride such as maleic anhydride or itaconic anhydride; an epoxy group-containing vinyl-based monomer such as glycidyl (meth)acrylate, α-ethylglycidyl acrylate, or 3,4-epoxybutyl (meth)acrylate; a vinyl-based monomer based on an amino group-containing (meth)acrylic acid ester such as dimethylaminoethyl (meth) acrylate or diethylaminoethyl (meth)acrylate; a vinyl-based monomer containing an amide group such as (meth)acrylamide, N-t-butyl (meth)acrylamide, N-methylol (meth)acrylamide, N-methoxymethyl (meth)acrylamide, N-butoxymethyl (meth)acrylamide, diacetone acrylamide, maleic acid amide, or maleimide; a heterocyclic basic monomer such as vinyl pyrrolidone, vinyl pyridine, or vinyl carbazole, a vinyl-based monomer such as styrene, vinyl toluene, α-methyl styrene, acrylonitrile, methacrylonitrile, vinyl acetate, or vinyl propionate, a polyether monomer having an alkoxyallylated terminal such as methoxyethylene glycol allyl ether, methoxypolyethylene glycol allyl ether, methoxypolyprolylene glycol allyl ether, butoxypolyethylene glycol allyl ether, butoxypolypropylene glycol allyl ether, methoxypolyethylene glycol-polypropylene glycol allyl ether, or butoxypolyethylene glycol-polypropylene glycol allyl ether, and a polyfunctional monomer such as ethylene glycol di(meth)acrylate, diethylene glycol di(meth) acrylate, triethylene glycol di(meth)acrylate, polyethylene glycol di(meth)acrylate, 1,4-butanediol di(meth)acrylate, 1,6-hexanediol di(meth)acrylate, neopentyl glycol di(meth) acrylate, 1,9-nonanediol di(meth)acrylate, 1,10-decanediol di(meth)acrylate, trimethylolpropane tri(meth)acrylate, pentaerythritol tetra(meth)acrylate, dipentaerythritol hexa(meth)acrylate, allyl methacrylate, triallyl cyanurate, diallyl maleate, or polypropylene glycol diallyl ether.

Furthermore, the vinyl-based polymer (B) can contain one kind of constitutional unit or two or more kinds of constitutional units selected from the constitutional unit (U11) and the constitutional unit (U12).

Among these, a (meth)acrylic acid ester is preferable because this monomer is copolymerized with other ethylenically unsaturated monomers.

One kind of these or two or more kinds of these can be used by being appropriately selected as necessary.

In a case where the first aspect of the polymer-containing composition of the present invention contains the vinyl-based polymer (B), the ratio of (meth)acryl-based copolymer (A-1):vinyl-based polymer (B) contained in the polymer-containing composition is preferably 98:2 to 70:30, and more preferably 95:5 to 75:25, in terms of a mass ratio.

In a case where the content of the vinyl-based polymer (B) is equal to or greater than the lower limit described above, the water resistance and the hardness of the coating film become preferable. In a case where the content of the vinyl-based polymer (B) is equal to or smaller than the upper limit described above, the self-polishing properties of the coating film tend to become preferable.

(Manufacturing Method Of Vinyl-Based Polymer (B))

The vinyl-based polymer (B) can be manufactured by the same method as the manufacturing method of the (meth) acryl-based copolymer (A-1) by selecting monomers according to the constitutional unit.

From the viewpoint of reducing the VOC content, a suspension polymerization method is preferable which makes it possible to recover the polymer as solids. Furthermore, from the viewpoint of manufacturing the vinyl-based polymer (B) having a low glass transition temperature, a solution polymerization method is preferable.

The suspension polymerization may be performed by a known method in which one kind of monomer or two or more kinds of monomers selected according to the constitutional unit, a chain transfer agent, and a polymerization initiator are added to water containing a dispersant and made into a suspension, the aqueous suspension is heated such that a polymerization reaction proceeds, and the aqueous suspension obtained after polymerization is filtered, washed, dehydrated, and dried.

As the dispersant, for example, it is possible to use a poly(meth)acrylic acid alkali metal salt, an alkali metal salt of a copolymer of (meth)acrylic acid and methyl (meth) acrylate, polyvinyl alcohol having a saponification degree of 70% to 100%, methyl cellulose, and the like. For the purpose of improving the dispersion stability of the aqueous suspension, electrolytes such as sodium carbonate, sodium sulfate, and manganese sulfate may also be used.

Examples of the chain transfer agent include a cobalt complex such as bis(borondifluorodiphenylglyoximate)cobalt (II), in addition to the mercaptans, the thioglycolic esters, the α-methylstyrene dimer, and the terpinolene described above. One kind of these can be used singly, or two or more kinds of these can be used in combination.

Among these, a cobalt complex is preferable which is less odorous and can reduce the molecular weight even being added in a small amount.

<Solvent (S)>

The polymer-containing composition of the present invention may further contain a solvent (S).

The solvent (S) is not particularly limited as long as it can dissolve the (meth)acryl-based copolymer (A-1). Examples thereof include monohydric alcohols such as methanol, ethanol, isopropanol, n-butanol, and propylene glycol monomethyl ether; polyhydric alcohols such as ethylene glycol and 1,2-propylene glycol; ketones such as acetone, methyl ethyl ketone, and acetyl acetone; ethers such as methyl ethyl ether and dioxane; glycol ethers such as ethylene glycol monoethyl ether, propylene glycol monomethyl ether, propylene glycol monoethyl ether, propylene glycol mono n-propyl ether, ethylene glycol dimethyl ether, diethylene glycol monomethyl ether, diethylene glycol dimethyl ether, and dipropylene glycol monopropyl ether; glycol acetates such as ethylene glycol monoacetate, ethylene glycol diacetate, and ethylene glycol monomethyl ether acetate; aliphatic hydrocarbons such as n-pentane and n-hexane; aromatic hydrocarbons such as toluene, xylene, and solvent naphtha; and the like. Any one kind among these can be used singly, or two or more kinds of these can be used in combination.

The content of the solvent (S) with respect to the total amount (100% by mass) of the polymer-containing composition is preferably 20% to 55% by mass, and more preferably 30% to 45% by mass.

<Another Component (Z-1)>

The polymer-containing composition of the present invention may further contain another component (Z-1) in addition to the (meth)acryl-based copolymer (A-1), the vinyl-based polymer (B), and the solvent (S).

Examples of another component (Z-1) are the same as the examples of another component (Z-2) in the antifouling coating composition which will be described later.

The content of another component (Z-1) with respect to 100 parts by mass of the (meth)acryl-based copolymer (A-1) is preferably equal to or smaller than 200 parts by mass, and may be 0 part may mass.

<Characteristics of First Aspect Of Polymer-Containing Composition>

(Coating Film Hardness (Martens Hardness)>

In the first aspect of the polymer-containing composition of the present invention, a hardness (Martens hardness) of the coating film obtained from the composition is equal to or higher than 2.5 N/mm$^2$.

The coating film hardness (Martens hardness) of the polymer-containing composition is preferably 3.0 to 40.0 N/mm$^2$, and more preferably 3.5 to 30.0 N/mm$^2$.

In a case where the coating film hardness (Martens hardness) of the polymer-containing composition is equal to or higher than the lower limit described above, the hardness and the physical properties of the coating film become preferable, and a coating film having a wear degree appropriate for expressing a long-term antifouling effect can be formed. In a case where the coating film hardness (Martens hardness) of the polymer-containing composition is equal to or lower than the upper limit described above, the crack resistance tends to become preferable.

In the present invention, the coating film hardness (Martens hardness) of the polymer-containing composition is measured according to the following method.

By using a 500 μm applicator, a glass substrate is coated with the polymer-containing composition such that a dry film thickness becomes 80 to 150 μm, and the polymer-containing composition is dried for 1 week at 25° C., thereby obtaining a test plate on which a coating film of the polymer-containing composition is formed. By using a microhardness tester (manufactured by FISCHER INSTRUMENTS K.K., trade name: HM2000), the hardness (Martens hardness) of the coating film on the test plate is measured at 25° C.

(Viscosity (Gardner Viscosity))

In the first aspect, a viscosity, that is, a Gardner viscosity of the polymer-containing composition of the present invention in at least a solid content of 55% by mass is preferably equal to or lower than Z, more preferably equal to or lower than V, and still more preferably equal to or lower than S.

In a case where the Gardner viscosity of the polymer-containing composition is equal to or lower than the upper limit described above, even though a solvent for dilution is not added to the polymer-containing composition, the composition can be mixed with an antifouling agent and the like or can be used for coating, and an antifouling coating composition with a small VOC content is obtained.

The lower limit of the viscosity of the polymer-containing composition is not particularly limited. However, in view of inhibiting coating material sagging at the time of coating, the Gardner viscosity of the polymer-containing composition is preferably equal to or higher than D.

The Gardner viscosity is a value measured using a Gardner bubble viscometer at 25° C.

The viscosity of the polymer-containing composition can be adjusted by the amount of solid contents of the polymer-containing composition (content of the (meth)acryl-based copolymer (A-1) and other components), the weight-average molecular weight of the (meth)acryl-based copolymer (A-1), the glass transition temperature, the presence or absence of a crosslinked structure, and the like. For example, regarding the amount of the solid content, the smaller the content of the (meth)acryl-based copolymer (A-1) is, the lower the viscosity tends to be. Furthermore, the smaller the weight-average molecular weight of the (meth)acryl-based copolymer (A-1) is or the lower the glass transition temperature is, the lower the viscosity tends to be.

(Solid Content)

In the first aspect, the solid content of the polymer-containing composition of the present invention is preferably 45% to 80% by mass, and more preferably 55% to 70% by mass.

In a case where the solid content of the polymer-containing composition is equal to or greater than the lower limit described above, the coating material viscosity is reduced, and VOC in the coating material can be reduced. In a case where the solid content of the polymer-containing composition is equal to or smaller than the upper limit described above, the coating material viscosity can become suited for coating.

In the present invention, the solid content can be measured according to the following method.

A measurement sample (0.50 g) is weighed and placed on a dish made of aluminum, and 3 mL of toluene is added thereto by using a pipette and evenly spread on the bottom of the dish, and pre-drying is performed. The pre-drying is a treatment in which the measurement sample is spread over the entirety of the dish so as to make it easy for a solvent to volatilize by the following main drying. During the pre-drying, the measurement sample and toluene are heated and dissolved in a water bath at a temperature of 70° C. to 80° C. so as to perform evaporation to dryness. After the pre-drying, main drying is performed for 2 hours in a hot air drying machine at 105° C. From the mass of the measurement sample before the pre-drying (mass before drying) and the mass of the measurement sample after the main drying (mass after drying), a heating residue is calculated by the following formula, and the calculated value is adopted as a solid content.

Heating residue (mass %)=mass after drying/mass before drying×100

(Solubility parameter)

The solubility parameter (hereinafter, referred to as "SP value" as well) of the polymer-containing composition is preferably less than 11.1 $(cal/cm^3)^{1/2}$, more preferably 8.0 to 10.6 $(cal/cm^3)^{1/2}$, and even more preferably 8.5 to 10.1 $(cal/cm^3)^{1/2}$.

In a case where the solubility parameter of the (meth) acryl-based copolymer (A-1) is equal to or higher than the lower limit described above, a good wear degree is obtained. In a case where the solubility parameter is equal to or lower than the upper limit described above, good antifouling properties last for a long period of time.

The SP value is an index of solubility. In the present application, the SP value refers to a value calculated from measured values in the following manner.

A measurement sample (0.5 g, amount of solid content) is weighed and put into a 200 ml beaker, 100 ml acetone is added thereto as a good solvent, and the solution is stirred for 30 minutes by using a magnetic stirrer.

Then, 5 ml of the acetone solution is measured and put into a 100 ml beaker, n-heptane as a poor solvent is added dropwise to the solution under stirring by using a burette at room temperature, and the amount of n-pentane consumed until the solution becomes turbid is measured (the amount is denoted by H (ml)).

Furthermore, 20 ml of the acetone solution is measured and put into a 100 ml beaker, deionized water as a poor solvent is added dropwise to the solution under stirring by using a burette at room temperature in the same manner as that described above, and the amount of deionized water consumed until the solution becomes turbid is measured (the amount is denoted by W (ml)).

By putting the measured values, H and W, in the following formula, a solubility parameter is calculated.

$$\text{Value of solubility parameter} = \{[9.9 \times (1-\alpha) + 7.4 \times \alpha] \times (\sqrt{\alpha}) + [9.9 \times (1-\beta) + 23.4 \times \beta] \times (\sqrt{\beta})\} / [(\sqrt{\alpha}) + (\sqrt{\beta})]$$

Here, $\alpha = H/(H+10)$, and $\beta = W/(W+10)$ 9.9 is derived from the value of solubility parameter of acetone, 7.4 is derived from the value of solubility parameter of n-heptane, and 23.4 is derived from the value of solubility parameter of deionized water ("POLYMER HANDBOOK, FOURTH EDITION, J. Brandrup et al., VII/p.688-694").

Next, a second aspect of the polymer-containing composition of the present invention will be specifically described.

The second aspect of the polymer-containing composition of the present invention contains a (meth)acryl-based copolymer (A-2).

<(Meth)Acryl-Based Copolymer (A-2)>

The (meth)acryl-based copolymer (A-2) contains the constitutional unit (U11) or the constitutional unit (U12) described above, has a weight-average molecular weight of 1,000 to 5,000, and further contains the constitutional unit (U3) described above, in which the constitutional unit (U3) contains a constitutional unit derived from a monomer (u3-1) having a substituted or unsubstituted alicyclic functional group, and a constitutional unit whose proportion in the total mass (100% by mass) of the constitutional unit (U3) is equal to or higher than 30% by mass, preferably 35% to 90% by mass, and more preferably 40% to 80% by mass is derived from a monomer having a Tg equal to or higher than 50° C.

A preferable range of each of other requirements for the (meth)acryl-based copolymer (A-2) is the same as that of the (meth)acryl-based copolymer (A-1).

By having a carboxylate-containing constitutional unit forming an ionic bond with the divalent metal atom represented by M, the (meth)acryl-based copolymer (A-2) expresses self-polishing properties.

<Aspects Other Than (Meth)Acryl-Based Copolymer (A-2)>

The aspects of the vinyl-based polymer (B), the solvent (S), and another component (Z-1) in the second aspect of the polymer-containing composition of the present invention are the same as those in the first aspect of the polymer-containing composition of the present invention.

<Characteristics of Second Aspect of Polymer-Containing Composition>

In the second aspect of the polymer-containing composition of the present invention, a hardness (Marten hardness) of a coating film obtained from the composition is preferably equal to or higher than 2.5 $N/mm^2$, more preferably 3.0 to 40.0 $N/mm^2$, and even more preferably 3.5 to 30.0 $N/mm^2$.

Among the characteristics of the second aspect of the polymer-containing composition of the present invention, the viscosity (Gardner viscosity), the solid content, and the solubility parameter are the same as those in the first aspect of the polymer-containing composition of the present invention.

<Use Of Polymer-Containing Composition of Present Invention>

The coating film containing the polymer-containing composition (including the first aspect and the second aspect) of the present invention contains the (meth)acryl-based copolymer (A-1) or the (meth)acryl-based copolymer (A-2) (hereinafter, the (meth)acryl-based copolymer (A-1) and the (meth)acryl-based copolymer (A-2) will be collectively referred to as "(meth)acryl-based copolymer (A)" in some cases). Therefore, the coating film exhibits self-polishing properties. That is, the coating film obtained from the polymer-containing composition of the present invention has a constitutional unit containing either or both of —(C=O)—O—M—O—(C=O)— and —(C=O)—O—M—$R^{32}$. The coating film is not dissolved in seawater in this state. However, by the contact with the seawater, the structure is hydrolyzed, a carboxy group is generated, and hence the coating film is dissolved in the seawater. The surface of the coating film contacts the seawater. Accordingly, the surface is gradually dissolved, and hence the coating film undergoes surface renewal (self-polishing).

The polymer-containing composition of the present invention can be directly made into an antifouling coating composition or can be made into an antifouling coating composition by being mixed with an antifouling agent and the like if necessary. The coating film containing the antifouling coating composition containing the polymer-containing composition of the present invention also exhibits self-polishing properties. By undergoing surface renewal in the seawater, this coating film exhibits antifouling properties. Particularly, in a case where the coating film contains an antifouling agent, the antifouling agent is exposed on the surface of the coating film all the time, and hence a good antifouling effect is exhibited over a long period of time.

Furthermore, this coating film has good hardness or water resistance. Therefore, the coating film hardly undergoes damage or peeling that results in a decrease in the antifouling effect. In addition, the wear degree can be adjusted to become optimal such that the good antifouling effect is stably exhibited over a long period of time.

The polymer-containing composition of the present invention contains the (meth)acryl-based copolymer (A) having low viscosity. Therefore, even though a solvent is not additionally added at the time of manufacturing an antifouling coating composition, it is possible to obtain an antifouling coating composition having coating suitability. Furthermore, in a case where an antifouling agent and the like are added, even though a solvent is not added, the polymer-containing composition can be mixed with the antifouling agent and the like. Accordingly, it is possible to obtain an antifouling coating composition with a small VOC content. The VOC content in the antifouling coating composition of the present invention that will be described later is equal to or lower than 420 g/L, for example.

The polymer-containing composition of the present invention can also be used in an anti-fog coating material composition and the like in addition to the antifouling coating composition.

[Antifouling Coating Composition]

The antifouling coating composition of the present invention contains the polymer-containing composition of the present invention described above. Accordingly, the antifouling coating composition contains the (meth)acryl-based copolymer (A) and contains, if necessary, the vinyl-based polymer (B) and the solvent (S) and/or another component (Z-1).

<Antifouling Agent (F)>

It is preferable that the antifouling coating composition of the present invention further contains an antifouling agent (F).

Examples of the antifouling agent (F) include an inorganic antifouling agent, an organic antifouling agent, and the like. According to the required performance, it is possible to appropriately select and use one kind of antifouling agent or two or more kinds of antifouling agents.

Examples of the antifouling agent (F) include a copper-based anti fouling agent such as cuprous oxide, copper thiocyanate, or copper powder, compounds of other metals (lead, zinc, nickel, and the like), an amine derivative such as diphenylamine, a nitrite compound, a benzothiazole-based compound, a maleimide-based compound, a pyridine-based compound such as zinc pyrithione or copper pyrithione, and the like.

More specifically, examples of the antifouling agent (F) include 4-bromo-2-(4-chlorophenyl)-5-(trifluoromethyl)-1H-pyrrole-3-carbonitrile, manganese ethylenebisdithiocarbamate, zinc dimethyldithiocarbamate, 2-methylthio-4-t-butylamino-6-cyclopropylamino-s-triazine, 2,4,5,6-tetrachloroisophthalonitrile, N,N-dimethyldichlorophenyl urea, zinc ethylenebisdithiocarbamate, copper rhodanide, 4,5-dichloro-2-n-octyl-3(2H)-isothiazolone, N-(fluorodichloromethylthio)phthalmide, N,N'-dimethyl-N'-phenyl-(N-fluorodichloromethylthio)sulfamide, 2-pyridinethiol-1-oxide zinc salt (zinc pyrithione), 2-pyridinethiol-1-oxide copper salt (copper pyrithione), tetramethylthiuram disulfide, a Cu-10% Ni solid solution alloy, 2,4,6-trichlorophenyl maleimide 2,3,5,6-tetrachloro-4-(methylsulfonyl)pyridine, 3-iodo-2-propinylbutyl carbamate, diiodomethyl-p-tolyl sulfone, bisdimethyldithiocarbamoyl zinc ethylenebisdithiocarbamate, phenyl(bispyridyl)bismuth dichloride, 2-(4-thiazolyl)-benzimidazole, medetomidine, pyridine-triphenylborane, and the like.

In view of improving the antifouling performance, it is preferable that the antifouling coating composition contains at least one kind of antifouling agent selected from the group consisting of cuprous oxide, 4-bromo-2-(4-chlorophenyl)-5-(trifluoromethyl)-1H-pyrrole-3-carbonitrile, pyridine-triphenylborane, zinc pyrithione, copper pyrithione, and medetomidine.

Furthermore, at least two kinds of antifouling agents selected from the group consisting of cuprous oxide, 4-bromo-2-(4-chlorophenyl)-5-(trifluoromethyl)-1H-pyrrole-3-carbonitrile, zinc pyrithione, copper pyrithione, and medetomidine may be combined.

In a case where the antifouling coating composition of the present invention contains the antifouling agent (F), the content of the antifouling agent (F) in the antifouling coating composition is not particularly limited, but is preferably 10 to 200 parts by mass and more preferably 50 to 150 parts by mass with respect to the content (100 parts by mass) of the (meth)acryl-based copolymer (A).

In a case where the content of the antifouling agent (F) in the antifouling coating composition is equal to or greater than the lower limit described above, the antifouling effect of the formed coating film is further improved. In a case where the content of the antifouling agent (F) in the antifouling coating composition is equal to or smaller than the upper limit described above, the physical properties of the coating film become preferable.

<Another Component (7-2)>

The antifouling coating composition of the present invention may further contain another component (Z-2) in addition to the (meth)acryl-based copolymer (A) and the antifouling agent (F). Another component (Z-2) may be a component (including the vinyl-based polymer (B), the solvent (S), and another component (Z-1)) derived from the polymer-containing composition of the present invention. Alternatively, another component (Z-2) may be a component which is not derived from the polymer-containing composition of the present invention, that is, a component mixed in at the time of manufacturing the antifouling coating composition, or a mixture of these.

The antifouling coating composition of the present invention may contain a solvent which is not derived from the polymer-containing composition of the present invention, that is, a solvent which is mixed in at the time of manufacturing the antifouling coating composition.

Examples of another component (Z-2) contained in the antifouling coating composition of the present invention include resins other than the (meth)acryl-based copolymer (A).

Examples of those other resins include a resin which does not have the constitutional unit (U11) and the constitutional unit (U12), such as a thermoplastic resin.

The antifouling coating composition of the present invention preferably contains a thermoplastic resin other than the (meth)acryl-based copolymer (A). The thermoplastic resin is more preferably a thermoplastic resin other than the vinyl-based polymer (B). In a case where the antifouling coating composition contains the thermoplastic resin other than the (meth)acryl-based copolymer (A), the physical properties of the coating film such as crack resistance or water resistance is improved.

Examples of the thermoplastic resin other than the (meth)acryl-based copolymer (A) include chlorinated paraffin; a chlorinated polyolefin such as chlorinated rubber, chlorinated polyethylene, or chlorinated polypropylene; polyvinyl ether; polypropylene sebacate; partially hydrogenated terphenyl; polyvinyl acetate; a poly(meth)acrylic acid alkyl ester such as a methyl (meth)acrylate-based copolymer, an ethyl (meth)acrylate-based copolymer, a propyl (meth)acrylate-based copolymer, a butyl (meth)acrylate-based copolymer, or a cyclohexyl (meth)acrylate-based copolymer; polyether polyol; an alkyd resin; a polyester resin; a vinyl chloride-based resin such as a vinyl chloride-vinyl acetate copolymer, a vinyl chloride-vinyl propionate copolymer, a vinyl chloride-isobutyl vinyl ether copolymer, a vinyl chloride-isopropyl vinyl ether copolymer, or a vinyl chloride-ethyl vinyl ether copolymer; silicone oil; wax; fat and oil staying solid at room temperature other than wax, fat and oil staying liquid at room temperature such as castor oil, and purified products of these; Vaseline; liquid paraffin; rosin, hydrogenated rosin, naphthenic acid, a fatty acid, divalent metal salts of these; and the like.

Examples of the wax include animal-derived wax such as beeswax; plant-derived wax; semi-synthetic wax such as amide-based wax; synthetic wax such as oxidized polyethylene-based wax; and the like.

Among the above, chlorinated paraffin, wax, polyvinyl ether, polyether polyol, rosin, and a vinyl chloride-isobutyl vinyl ether copolymer are preferable, and chlorinated paraffin, amide-based wax, oxidized polyethylene-based wax, polyvinyl ether, rosin, and a vinyl chloride-isobutyl vinyl ether copolymer are particularly preferable.

Only one kind of these thermoplastic resins may be used singly, or two or more kinds of these thermoplastic resins may be used in combination.

The content of another component (Z-2) (including the vinyl-based polymer (B), the solvent (S), and another component (Z-1)) contained in the antifouling coating composition is not particularly limited, but is preferably 50 to 400 parts by mass and more preferably 100 to 350 parts by mass with respect to 100 parts by mass of the (meth)acryl-based copolymer (A).

The content of the thermoplastic resin in the antifouling coating composition is not particularly limited, but is preferably 0.1 to 50 parts by mass and more preferably 0.1 to 10 parts by mass with respect to the content (100 parts by mass) of the (meth)acryl-based copolymer (A).

In a case where the content of the thermoplastic resin in the antifouling coating composition is equal to or greater than the lower limit described above, the physical properties of the coating film such as crack resistance or water resistance is further improved. In a case where the content of the thermoplastic resin in the antifouling coating composition is equal to or smaller than the upper limit described above, the hydrolyzability is further improved.

For the purpose of imparting lubricating properties on the surface of the coating film so as to prevent the adhesion of living organisms, the antifouling coating composition of the present invention may contain, as another component (Z-2), a silicone compound such as dimethyl polysiloxane or silicone oil, a fluorine-containing compound such as fluorinated hydrocarbon, and the like.

Furthermore, the antifouling coating composition of the present invention may contain, as another component (Z-2), various pigments, an antifoaming agent, a pigment dispersant, a leveling agent, an anti-sagging agent, a delustering agent, an ultraviolet absorber, an antioxidant, a heat resistance enhancer, a slip agent, a preservative, a plasticizer, a viscosity control agent, and the like.

<Content of VOC>

The content of VOC in the antifouling coating composition of the present invention is preferably equal to or smaller than 420 g/L, more preferably equal to or smaller than 400 g/L, and even more preferably equal to or smaller than 380 g/L. The VOC content is calculated by the following formula by using the specific gravity and the value of heating residue of the antifouling coating composition.

VOC content (g/L)=specific gravity of antifouling coating composition×1,000×(100−heating residue)/100

The specific gravity of the antifouling coating composition is calculated by filling a specific gravity cup having a volume of 100 mL with the antifouling coating composition at 25° C. and measuring the mass thereof.

The heating residue of the antifouling coating composition means a mass ratio of a heating residue remaining in a case where the antifouling coating composition is subjected to pre-drying and then dried for 2 hours at 105° C. by using a hot air drying machine so as to volatilize the solvent and the like. The pre-drying is a treatment in which the measurement sample is spread over the entirety of the dish so as to make it easy for a solvent to volatilize by the following main drying. During the pre-drying, the measurement sample and toluene are heated and dissolved in a water bath at a temperature of 70° C. to 80° C. so as to perform evaporation to dryness.

The VOC content can be adjusted by the content of a solvent.

The heating residue of the antifouling coating composition of the present invention is preferably 45% to 90% by mass, more preferably 55% to 85% by mass, and even more preferably 60% to 80% by mass.

In a case where the heating residue of the antifouling coating composition is equal to or greater than the lower limit described above, the VOC content is sufficiently reduced. In a case where the heating residue of the antifouling coating composition is equal to or smaller than the upper limit described above, the viscosity of the antifouling coating composition is easily reduced.

<Coating Film Viscosity>

The viscosity of the antifouling coating composition of the present invention that is measured using a B type viscometer at 25° C. is preferably less than 4,000 mPa·s, more preferably less than 3,000 mPa·s, and still more preferably less than 2,000 mPa·s.

In a case where the viscosity of the antifouling coating composition is equal to or lower than the upper limit described above, it is easy to perform coating.

The lower limit of the viscosity of the antifouling coating composition is not particularly limited. However, in view of inhibiting the sagging of coating material at the time of coating, the lower limit of the viscosity of the antifouling coating composition is preferably equal to or higher than 1,000 mPa·s.

The viscosity of the antifouling coating composition can be adjusted by the viscosity of the polymer-containing composition, the amount of a solvent added to the polymer-containing composition and the antifouling coating composition, and the like.

<Coating Material Solid Content>

The coating material solid content of the antifouling coating composition of the present invention is preferably equal to or greater than 60% by mass, more preferably 60% to 85% by mass, and even more preferably 70% to 80% by mass.

In a case where the coating material solid content is equal to or greater than the lower limit described above, the VOC in the coating material can be reduced. In a case where the coating material solid content is equal to or smaller than the upper limit described above, the coating material has viscosity suited for coating.

In the present specification, as the coating material solid content, a value measured by the same method as that used for measuring the solid content of the polymer-containing composition is used.

<Manufacturing Method of Antifouling Coating Composition>

The antifouling coating composition of the present invention can be prepared by adding, if necessary, the antifouling agent (F) or another component (Z-2) and the solvent (S) to the polymer-containing composition of the present invention and mixing these together.

<Use of Antifouling Coating Composition>

The antifouling coating composition of the present invention can be used for forming a coating film (antifouling coating film) on the surface of substrates such as underwater structures including ships or various fishing nets, port facilities, oil fences, bridges, and undersea bases.

The coating film in which the antifouling coating composition of the present invention is used can be formed on the surface of the substrates, directly or through a ground coating film.

The ground coating film can be formed using a wash primer, a primer based on chlorinated rubber, epoxy, or the like, intermediate coating material, and the like.

The coating film can be formed by a known method. For example, by coating the surface of a substrate or the ground coating film on a substrate with the antifouling coating composition by means of brush coating, spray coating, roller coating, dip coating, or the like and drying the antifouling coating composition, the coating film can be formed.

Generally, the coating amount of the antifouling coating composition can be set such that the thickness of the dried coating film becomes 10 to 400 μm.

The coating film can be dried generally at room temperature. If necessary, the coating film may be dried by heating.

Examples

Hereinafter, the present invention will be specifically described using examples and comparative examples, but the present invention is not limited to the following description as long as the gist of the present invention is maintained. Unless otherwise specified, "part" in the examples and the comparative examples means "part by mass". Various evaluations in the examples were performed by the methods described below.

(Weight-average molecular weight (Mw) and number-average molecular weight (Mn))

The weight-average molecular weight and the number-average molecular weight of measurement samples were measured by gel permeation chromatography (GPC) (manufactured by Tosoh Corporation, HLC-8220) by using DMF (N,N-dimethylformamide) as an eluent. As columns, TSK-gel α-M (manufactured by Tosoh Corporation, 7.8 mm×30 cm) and TSKguard column α (manufactured by Tosoh Corporation, 6.0 mm×4 cm) were used. A calibration curve was plotted using F288/F128/F80/F40/F20/F2/A1000 (manufactured by Tosoh Corporation, standard polystyrene) and a styrene monomer.

(Solid Content)

A measurement sample (0.50 g, a polymer-containing composition or an antifouling coating composition) was measured and placed on a dish made of aluminum, and 3 mL of toluene was added thereto by using a pipette and evenly spread on the bottom of the dish. By heating and drying the measurement sample and toluene in a water bath at a temperature of 70° C. to 80° C. so as to perform evaporation to dryness, pre-drying was carried out. After the pre-drying, main drying was performed for 2 hours in a hot air drying machine at 105° C. From the mass of the measurement sample before the pre-drying (mass before drying) and the mass of the measurement sample after the main drying (mass after drying), a heating residue was calculated by the following formula, and the value of the heating residue was adopted as a solid content.

$$\text{Heating residue (mass \%)} = \text{mass after drying/mass before drying} \times 100$$

(Viscosity)

The viscosity of the polymer-containing composition was measured at 25° C. by using a Gardner bubble viscometer.

Superficially, a sample was injected into a dried viscosity tube up to an index line of the viscosity tube, and sealed with a cork stopper. The viscosity tube into which the sample was collected was vertically immersed in a constant temperature water bath, which was controlled to have a predetermined temperature (25.0±0.1° C.), for at least 2 hours such that the temperature of the sample became constant. A viscosity tube as a reference tube and the viscosity tube filled with the sample were simultaneously rotated 180°, and a bubble rising rate of the sample was compared with that of the reference tube, thereby determining the viscosity.

The viscosity of the antifouling coating composition in Table 5 and Table 6 was measured at 25° C. by using a B type viscometer.

(Acid Value)

A measurement sample (about 0.5 g) was weighed and put into a beaker (A (g)), and 50 mL of a toluene/95% ethanol solution was added thereto. A few drops of phenolphthalein was added thereto, and titration was performed using a 0.5 M potassium hydroxide solution (titration amount=B (mL), titer of potassium hydroxide solution=f). Blank measurement was performed in the same manner as described above (titration amount=C (mL)), and the acid value was calculated according to the following formula.

$$\text{Acid value (mgKOH/g)} = \{(B-C) \times 0.2 \times 56.11 \times f\}/A/\text{solid content}$$

(Coating Film Hardness (Martens Hardness))

By using a 500 μm applicator, a glass substrate was coated with the polymer-containing composition such that a dry film thickness became 80 to 150 μm, and the polymer-containing composition was dried for 1 week at 25° C., thereby obtaining a test plate on which a coating film of the polymer-containing composition was formed. By using a microhardness tester (manufactured by FISCHER INSTRUMENTS K.K., trade name: HM2000), a coating film hardness (Martens hardness) of the coating film on the test plate was measured at 25° C.

The measurement conditions were set such that dQRST (F)/dt=constant, F (testing force)=10 mN/10 sec, C (creep time under maximum load)=5 sec, maximum indentation load=10 mN, and maximum indentation depth=6 μm. For three different sites within the coating film on the test plate, the coating film hardness (Martens hardness) was measured, and the average thereof was adopted as the hardness of the coating film.

(Wear Degree)

The wear degree of each of the coating film formed of the polymer-containing composition and the coating film formed of the antifouling coating composition shown in Table 2 was measured as below.

A 50 mm×50 mm×2 mm (thickness) hard vinyl chloride plate was coated with the polymer-containing composition or the antifouling coating composition by using an applicator such that a dry film thickness became 120 μm, and the composition was dried to form a coating film, thereby obtaining a test plate. By mounting the test plate on a rotary drum installed in artificial seawater and rotating the drum for 5 months at a circumferential speed of 7.7 m/s (15 knots), the wear degree was tested.

The wear degree of the coating film was calculated by the following formula.

Wear degree of coating film (μ/M)=[film thickness of initial coating film (μm)−film thickness after 5 months (μm)]/number of days of testing×30

In a case where the wear degree of the coating film was equal to or lower than 1 μm/M, it was concluded that the self-polishing properties of the coating film were insufficient.

Furthermore, after the wear degree test, by visually observing the surface of the coating film on the test plate, the condition of the coating film after the test for self-polishing properties was evaluated based on the following standards.

A: No change was observed within the surface of the coating film.

B: Slight crumpling (a state where the coating film had low hardness and was wavy) was observed at the edge of the surface of the coating film.

C1: Crumpling occurred on the surface of the coating film.

The condition of the coating film after the test for self-polishing properties shown in Table 3 and Table 4 was evaluated based on the following standards by performing a wear degree test in the same manner as described above by using the polymer-containing composition except that the test plate was rotated for 25 days, and visually observing the surface of the coating film on the test plate having undergone the wear degree test.

A: No abnormality was within the surface of the coating film.

B: Crumpling was observed in a portion of the coating film.

C1: Crumpling was observed in the entirety of the coating film.

C2: The entirety of the coating film turned white.

The wear degree shown in Table 5 and Table 6 was measured as described above by performing the aforementioned wear degree test in the same manner as described above by using the antifouling coating composition except that the test plate was rotated for 4 months.

The abbreviations in the tables mean the following compounds.

EA: ethyl acrylate
nBA: n-butyl acrylate
MMA: methyl methacrylate
nBMA: n-buty methacrylate
iBMA: i-butyl methacrylate
tBMA: t-butyl methacrylate
CHMA: cyclohexyl methacrylate
2-MTMA: 2-methoxyethyl methacrylate
St: styrene
A1BN: 2,2'-azobis(isobutyronitrile)
AMBN: 2,2'-azobis(2-methylbutyronitrile)
NOFMER MSD: trade name, manufactured by NOF CORPORATION, α-methylstyrene dimer
PEROCTA O: 1,1,3,3,-tetramethylbutylperoxy 2-ethylhexanoate Manufacturing Example A1 (Manufacturing of Mixture of Metal-Containing Polymerizable Monomer (u))

Propylene glycol monomethyl ether (PGM) (85.4 parts) and 40.7 parts of zinc oxide were put into a four-neck flask equipped with a cooler, a thermometer, a dripping funnel, and a stirrer, and heated to 75° C. while being stirred. Then, from the dripping funnel, a mixture of 43.1 parts of methacrylic acid, 36.1 parts of acrylic acid, and 5 parts of water was added dropwise thereto for 3 hours at a constant speed. After the dripping was finished, the reaction solution turned transparent from a milky-white state. The reaction solution was further stirred for 2 hours, and then 36 parts of PGM was added thereto, thereby obtaining a mixture (au1) of a metal-containing polymerizable monomer (u).

The solid content thereof was 45.0% by mass.

Manufacturing Example A2 (Manufacturing of Dispersant)

Deionized water (900 parts), 60 parts of sodium 2-sulfoethyl methacrylate, 10 parts of potassium methacrylate, and 12 parts of methyl methacrylate were put into a polymerization apparatus equipped with a stirrer, a cooling tube, and a thermometer, and heated to 50° C. in a state where nitrogen purging was being performed in the polymerization apparatus. As a polymerization initiator, 0.08 parts of 2,2'-azobis(2-methylpropionamine)dihydrochloride was added to the reaction mixture, and the reaction mixture was further heated to 60° C. After the heating, by using a dripping pump, methyl methacrylate was continuously added dropwise thereto for 75 minutes at a rate of 0.24 parts/min. The reaction solution was kept at 60° C. for 6 hours and then cooled to room temperature, thereby obtaining a dispersant al which was a transparent aqueous solution and had a solid content of 10% by mass.

Manufacturing Example A3 (Manufacturing of Chain Transfer Agent)

In a nitrogen atmosphere, 1.00 g of cobalt (II) acetate tetrahydrate, 1.93 g of diphenyl glyoxime, and 80 ml of diethyl ether deoxygenated in advance by means of nitrogen bubbling were put into a synthesis apparatus equipped with a stirring device, and stirred for 30 minutes at room temperature. Then, 10 ml of a boron trifluoride diethyl ether complex was added thereto, and the mixture was further stirred for 6 hours. The mixture was filtered, and the solids were washed with diethyl ether and dried in a vacuum for 15 hours, thereby obtaining 2.12 g of a chain transfer agent a1 as reddish brown solids.

Manufacturing Example A4 (Manufacturing of Vinyl-Based Polymer (B))

Deionized water (145 parts), 0.1 parts of sodium sulfate, and 0.1 parts of the dispersant a1 manufactured in Manufacturing Example A2 were put into a polymerization apparatus equipped with a stirrer, a cooling tube, and a thermometer, and stirred, thereby obtaining a homogenous aqueous solution. Then, 100 parts of methyl methacrylate, 0.005 parts of the chain transfer agent a1 manufactured in Manufacturing Example A3, and 0.5 parts of 1,1,3,3-tetramethylbutylperoxy 2-ethylhexanoate were added thereto, thereby obtaining an aqueous suspension. Thereafter, nitrogen purging was performed in the polymerization apparatus, and the aqueous suspension was reacted for about 1 hour by being heated to 80° C. In order to further increase the polymerization rate, the aqueous suspension was heated to 90° C., which was a post-treatment temperature, and kept as it was for 1 hour. Subsequently, the reaction solution was cooled to 40° C., thereby obtaining an aqueous suspension containing a polymer. The aqueous suspension was filtered through nylon filter cloth having 45 μm openings, and the residue was washed with deionized water, dehydrated, and dried for 16 hours at 40° C., thereby obtaining a vinyl-based polymer (B) aB-1.

The weight-average molecular weight (Mw) thereof was 7,000, and the number-average molecular weight (Mn) thereof was 3,500.

Manufacturing Example A5 (Manufacturing of Vinyl-Based Polymer (B))

A vinyl-based polymer (B) aB-2 was obtained in the same manner as in Manufacturing Example A4, except that the amount of components put into the polymerization apparatus was changed as shown in Table 1.

Manufacturing Example A6 (Manufacturing of Vinyl-Based Polymer (B))

n-Butanol (15 parts), 38 parts of xylene, and 4 parts of ethyl acrylate were put into a flask equipped with a cooling tube, a thermometer, a dripping tank, and a stirrer, and heated to 100° C. while being stirred. Then, from the dripping tank, a mixture of 42.1 parts of methyl methacrylate, 24 parts of ethyl acrylate, 25 parts of cyclohexyl methacrylate, 9.51 parts of a mixture (bu1) of a monomer (u1), 15 parts of n-butanol, 1.3 parts of a chain transfer agent (NOFMER MSD manufactured by NOF CORPORATION), 2.0 parts of AIBN, and 4.0 parts of AMBN was added dropwise thereto for 6 hours at a constant speed. Thirty minutes after the finish of the dripping, 0.5 parts of t-butyl peroctoate and 7 parts of xylene were added dropwise thereto for 30 minutes, the mixture was further stirred for 1 hour and 30 minutes, and then 2 parts of xylene was added thereto. Then, the mixture was filtered through 300 mesh, thereby obtaining a transparent light yellow vinyl-based polymer (B) aB-3 which had 56.0% of a heating residue and a Gardner viscosity U and did not contain an insoluble matter.

Manufacturing Examples A7 and A8 (Manufacturing of Vinyl-Based Polymer (B) or Vinyl-Based Polymer)

A vinyl-based polymer (B) aB-4 and a vinyl-based polymer aB-5 were obtained in the same manner as in Manufacturing Example A6, except that the amount of components put into the flask was changed as shown in Table 1.

In Table 1, bu1 (mixture) is the mixture (bu1) of the metal-containing polymerizable monomer (u) manufactured in Manufacturing Example B1. Furthermore, the content of the metal-containing polymerizable monomer (u) contained in the mixture (bu1) of the metal-containing polymerizable monomer (u) manufactured in Manufacturing Example B1 is shown in a parenthesis. The content of the metal-containing polymerizable monomer (u) was calculated as below.

Mixture of metal-containing polymerizable monomer (u) (part by mass)×solid content (%)/100

TABLE 1

|  |  |  | Manufacturing Example A4 | Manufacturing Example A5 | Manufacturing Example A6 | Manufacturing Example A7 | Manufacturing Example A8 |
|---|---|---|---|---|---|---|---|
| Vinyl-based polymer (B) or polymer-containing composition containing vinyl-based polymer (B) |  |  | aB-1 | aB-2 | aB-3 | aB-4 | aB-5 |
| Monomer | MMA | Part by mass | 100 | 50 | 42.1 | 32.5 | 26.2 |
|  | 2-MTMA |  | 0 | 50 | 0 | 0 | 0 |
|  | EA |  | 0 | 0 | 28.0 | 10.0 | 16.0 |
|  | nBMA |  | 0 | 0 | 0 | 0 | 0 |
|  | CHMA |  | 0 | 0 | 25.0 | 25.0 | 25.0 |
|  | nBA |  | 0 | 0 | 0 | 23.6 | 23.6 |
|  | bu1 (mixture) |  | 0 | 0 | 951 (4.28) | 9.51 (4.28) | 1902. (8.56) |
| Chain transfer agent a1 |  |  | 0.005 | 0.007 | 0 | 0 | 0 |
| NOFMER MSD |  |  | 0 | 0 | 1.3 | 1.3 | 1.3 |
| PEROCTA O |  |  | 0.50 | 1.30 | 0 | 0 | 0 |
| AIBN |  |  | 0 | 0 | 2.0 | 2.0 | 2.5 |
| AMBN |  |  | 0 | 0 | 4.0 | 2.0 | 6.0 |
| Tg |  | ° C. | 105 | 43 | 53 | 30 | 30 |
| Solid content |  | % by mass | 100 | 100 | 56.0 | 56.6 | 56.6 |

TABLE 1-continued

|  |  | Manufacturing Example A4 | Manufacturing Example A5 | Manufacturing Example A6 | Manufacturing Example A7 | Manufacturing Example A8 |
|---|---|---|---|---|---|---|
| Viscosity |  | — | — | –U | ST | P |
| Acid value | mgKOH/g | 0 | 0 | 20 | 20 | 40 |
| Mw |  | 7000 | 7300 | 5700 | 6700 | 4600 |
| Mn |  | 3500 | 3800 | 2300 | 2700 | 1800 |

Examples A1 to A6 and Comparative Example A7 (Manufacturing of Polymer-Containing Composition and Antifouling Coating Composition)

By using the (meth)acryl-based copolymer (A) and the vinyl-based polymers (B) (aB-1 to aB-5), components were mixed together by a high-speed disper according to the formulation (solid content %) shown in Table 2, thereby obtaining polymer-containing compositions (aP1 to aP7).

Furthermore, by using the (meth)acryl-based copolymer (A) and the vinyl-based polymers (B), components were put into a metallic can according to the formulation shown below. Then, glass beads were added thereto, and the components were premixed together by using a stirring rod. The obtained mixture was subjected to pigment dispersion by using a rocking shaker, thereby obtaining antifouling coating compositions (aP'1 to aP'7).

aP1 to aP7: 100 parts
Zinc oxide: 45 parts
TTK talc: 25 parts
DISPARLON 4200-20 (manufactured by Kusumoto Chemicals, Ltd., anti-sagging agent): 8 parts
4-Bromo-2-(4-chlorophenyl)-5-(trifluoromethyl)-1H-pyrrole-3-carbonitrile: 15 parts
Cuprous oxide: 3 parts
Xylene: 5 parts Each of bA-8, bA-15, and bA-16 used as the (meth)acryl-based copolymer (A) is a polymer-containing composition containing the (meth)acryl-based copolymer (A) manufactured in each of Example B8, Example B12, and Comparative Example B4 which will be described later.

Table 2 shows the evaluation results of the obtained polymer-containing compositions and antifouling coating compositions.

In Examples A1 to A6, the wear degree was high, and the coating film hardness and the coating film condition after the test for self-polishing properties were preferable.

In contrast, in Comparative Example A7 in which the vinyl-based polymer (B) (aB-5) having a high acid value was used, the coating film formed of the polymer-containing composition became defective after the test for self-polishing properties, the wear degree of the coating film formed of the antifouling coating composition was high, and the long-term antifouling properties tended to become defective.

Manufacturing Example B1 (Manufacturing of Mixture of Metal-Containing Polymerizable Monomer (u))

n-Butanol (85.4 parts) and 40.7 parts of zinc oxide were put into a four-neck flask equipped with a cooler, a thermometer, a dripping funnel, and a stirrer, and heated to 75° C. while being stirred. Then, from the dripping funnel, a mixture of 43.1 parts of methacrylic acid, 36.1 parts of acrylic acid, and 5 parts of water was added dropwise thereto for 3 hours at a constant speed. After the dripping was finished, the reaction solution turned transparent from a milky-white state. The reaction solution was further stirred for 2 hours, and then 36 parts of n-butanol was added thereto, thereby obtaining a mixture (bu1) of a metal-containing polymerizable monomer (u).

The solid content thereof was 44.8% by mass.

TABLE 2

|  |  |  | Example | | | | | | Comparative Example |
|---|---|---|---|---|---|---|---|---|---|
|  |  |  | A1 | A2 | A3 | A4 | A5 | A6 | A7 |
| Polymer-containing composition |  |  | aP1 | aP2 | aP3 | aP4 | aP5 | aP6 | aP7 |
| (meth)acryl-based | hA-8 | Part | 0 | 0 | 80 | 0 | 0 | 80 | 0 |
| copolymer (A) | hA-15 | by | 0 | 0 | 0 | 80 | 80 | 0 | 80 |
| (solid content) | hA-16 | mass | 80 | 80 | 0 | 0 | 0 | 0 | 0 |
| Vinyl-based | aB-1 |  | 20 | 0 | 20 | 0 | 0 | 0 | 0 |
| polymer (B) | aB-2 |  | 0 | 20 | 0 | 0 | 0 | 0 | 0 |
| (solid content) | aB-3 |  | 0 | 0 | 0 | 20 | 0 | 20 | 0 |
|  | aB-4 |  | 0 | 0 | 0 | 0 | 20 | 0 | 0 |
|  | aB-5 |  | 0 | 0 | 0 | 0 | 0 | 0 | 20 |
| Xylene |  |  | 13 | 13 | 13 | 0 | 0 | 0 | 0 |
| Solid content |  | % | 57.6 | 57.5 | 56.9 | 56.0 | 56.6 | 56.0 | 56.6 |
| Viscosity |  |  | UV | +R | S | ST | –S | –U | PQ |
| Acid value |  | mgKOH/g | 84 | 84 | 67 | 71 | 71 | 71 | 75 |
| SP value |  | $(cal/cm^3)^{1/2}$ | 11.3 | 11.3 | 10.8 | 10.3 | 10.4 | 9.8 | 10.6 |
| Coating film hardness |  | $N/mm^2$ | 6.8 | 6.2 | 8.6 | 2.6 | 2.5 | 3.6 | 2.2 |
| Coating film condition after test for self-polishing properties |  |  | A | A | A | A | A | A | C1 |
| Antifouling coating composition |  |  | aP'1 | aP'2 | aP'3 | aP'4 | aP'5 | aP'6 | aP'7 |
| Wear degree |  | μm/M | 3.2 | 3.4 | 2.4 | 7 | 8 | 1.6 | 10.2 |

Manufacturing Example B2 (Manufacturing of Mixture of Metal-Containing Polymerizable Monomer (u))

PGM (24.3 parts), 61.1 parts of n-butanol, and 40.7 parts of zinc oxide were put into a four-neck flask equipped with a cooler, a thermometer, a dripping funnel, and a stirrer, and heated to 75° C. while being stirred. Then, from the dripping funnel, a mixture of 38.7 parts of methacrylic acid, 32.4 parts of acrylic acid, and 14.4 parts of octylic acid was added dropwise thereto for 3 hours at a constant speed. After the dripping was finished, the reaction solution turned transparent from a milky-white state. The reaction solution was further stirred for 2 hours, and then 25.5 parts of n-butanol was added thereto, thereby obtaining a mixture (bu1) of a metal-containing polymerizable monomer (u).

The solid content thereof was 50.1% by mass.

Example B1 (Manufacturing of Polymer-Containing Composition Containing (Meth)Acryl-Based Copolymer (A))

n-Butanol (15 parts), 35 parts of xylene, and 4 parts of ethyl acrylate were put into an autoclave which was equipped with a cooler, a thermometer, a dripping tank, and a stirrer and could perform polymerization under pressure, and heated to 140° C. while being stirred under a pressure of 350 kPa. Then, from the dripping tank, a mixture of 28.3 parts of methyl methacrylate, 11.7 parts of ethyl acrylate, 30 parts of n-butyl acrylate, 8 parts of cyclohexyl methacrylate, 40 parts of the mixture (bu1) of the monomer (u1) manufactured in Manufacturing Example B1, 1.2 parts of a chain transfer agent (NOFMER MSD manufactured by NOF CORPORATION), 2.5 parts of AIBN, and 6 parts of AMBN was added dropwise thereto for 3 hours at a constant speed. After the dripping was finished, the mixture was cooled to 110° C. for 30 minutes, 0.5 parts of t-butyl peroctoate and 7 parts of xylene were added dropwise thereto for 30 minutes, the mixture was further stirred for 1 hour and 30 minutes, and then 6 parts of xylene was added thereto. Then, the mixture was filtered through 300 mesh, thereby obtaining a transparent light yellow polymer-containing composition (bA-1) which had 56.0% of a heating residue and a Gardner viscosity S and did not contain an insoluble matter.

Examples B2 to B12 and Comparative Examples B1 to B4 (Manufacturing of Polymer-Containing Composition)

A polymer-containing composition (bA-2) to a polymer-containing composition (bA-16) in the form of solutions were manufactured in the same manner as in Example B1, except that the amount of monomers put into the autoclave was changed as shown in Table 3 and Table 4.

Here, in Comparative Example B1, 60 parts out of 70 parts of xylene were used first, and then the remaining 10 parts were added dropwise at a constant speed to the mixture to be added.

In all the examples, ethyl acrylate was put into the autoclave first in an amount of 4 parts, and then the balance was added dropwise to the autoclave at a constant speed from the dripping tank.

In the tables, the content of the metal-containing polymerizable monomer (u) contained in each of the mixture (bu1) of the metal-containing polymerizable monomer (u) manufactured in Manufacturing Example B1 and the mixture (bu2) of the metal-containing polymerizable monomer (u) manufactured in Manufacturing Example B2 is shown in a parenthesis. The content of the metal-containing polymerizable monomer (u) was calculated as below.

Mixture of metal-containing polymerizable monomer
(u) (part by mass)×solid content (%)/100

TABLE 3

| | | | Example | | | | | | | |
|---|---|---|---|---|---|---|---|---|---|---|
| | | | B1 | B2 | B3 | B4 | B5 | B6 | B7 | B8 |
| Polymer-containing composition | | | bA-1 | bA-2 | bA-3 | bA-4 | bA-5 | bA-6 | bA-7 | bA-8 |
| Metal-containing polymerizable monomer (u) | Mixture (bu1) | Part by mass | 40 (18) | 40 (18) | 40 (18) | 40 (18) | 40 (18) | 40 (18) | 0 (0) | 40 (18) |
| | Mixture (bu2) | | 0 | 0 | 0 | 0 | 0 | 0 | 39.0 (19.5) | 0 |
| Monomer (constitutional unit (U3)) | MMA | | 28.3 | 22.3 | 22.3 | 22.3 | 11.3 | 37 | 22.8 | 36.3 |
| | EA | | 15.7 | 14.7 | 14.7 | 14.7 | 10.7 | 0.0 | 12.7 | 15.7 |
| | nBA | | 30 | 30 | 30 | 30 | 30 | 30 | 30 | 30 |
| | tBMA | | 0 | 0 | 0 | 0 | 0 | 0 | 0 | 0 |
| | iBMA | | 0 | 0 | 0 | 0 | 0 | 0 | 0 | 0 |
| | St | | 0 | 0 | 0 | 0 | 0 | 0 | 0 | 0 |
| Monomer (u3-1) | CHMA | | 8 | 15 | 15 | 15 | 30 | 15 | 15 | 0 |
| AIBN | | | 2.5 | 2.5 | 2.5 | 2.5 | 2.5 | 2.5 | 2.5 | 2.5 |
| AMBN | | | 6 | 6 | 5 | 4 | 3 | 6 | 4.5 | 5 |
| Solvent (S) | n-Butanol | | 15 | 15 | 15 | 15 | 15 | 15 | 15 | 15 |
| | Xylene | | 35 | 35 | 35 | 35 | 35 | 35 | 35 | 35 |
| NOFMER MSD | | | 1.2 | 1.2 | 1.2 | 1.2 | 1.2 | 1.2 | 1.2 | 1.2 |
| Polymer-containing composition ((meth)acryl-based copolymer (A)) | Solid content | % by mass | 56.0 | 56.8 | 56.2 | 56.1 | 58.3 | 56.3 | 56.5 | 56.4 |
| | Viscosity | | S | KL | U | Z | TU | T | S | U– |
| | Acid value | mgKOH/g | 84 | 84 | 84 | 84 | 84 | 84 | 84 | 84 |
| | Mw | | 3900 | 4000 | 4200 | 4900 | 4700 | 4300 | 4700 | 3700 |
| | Mn | | 1300 | 1300 | 1400 | 1500 | 1400 | 1200 | 1500 | 1300 |
| | SP value | $(cal/cm^3)^{1/2}$ | 10.1 | 10.0 | 9.8 | 9.7 | 9.3 | 9.7 | 9.6 | 10.4 |
| Physical properties of coating film | Coating film condition after test for self-polishing properties | | A | A | A | A | A | A | A | B |
| | Coating film hardness | N/mm² | 3.2 | 3.2 | 3.5 | 3.8 | 3.5 | 4.0 | 3.0 | 3.4 |

TABLE 4

|  |  |  | Example | | | | Comparative Example | | | |
|---|---|---|---|---|---|---|---|---|---|---|
|  |  |  | B9 | B10 | B11 | B12 | B1 | B2 | B3 | B4 |
| Polymer-containing composition |  |  | bA-12 | bA-13 | bA-14 | bA-15 | bA-9 | bA-10 | bA-11 | bA-16 |
| Metal-containing polymerizable monomer (u) | Mixture (bu1) | Part by mass | 40 (18) | 40 (18) | 45 (20.3) | 40 (18) | 40 (18) | 40 (18) | 0 | 50 (22.5) |
|  | Mixture (bu2) |  | 0 | 0 | 0 | 0 | 0 | 0 | 39.0 (19.5) | 0 |
| Monomer (constitutional unit (U3)) | MMA |  | 20 | 31.3 | 20 | 43 | 22.3 | 15.0 | 13.5 | 10.4 |
|  | EA |  | 50 | 15.7 | 14.7 | 9 | 14.7 | 52.0 | 52.0 | 34.6 |
|  | nBA |  | 0 | 0 | 30 | 25 | 30 | 15 | 15 | 28 |
|  | tBMA |  | 12 | 0 | 0 | 0 | 0 | 0 | 0 | 0 |
|  | iBMA |  | 0 | 10 | 0 | 0 | 0 | 0 | 0 | 0 |
|  | St |  | 0 | 5 | 0 | 0 | 0 | 0 | 0 | 0 |
| Monomer (u3-1) | CHMA |  | 0 | 20 | 15 | 0 | 15 | 0 | 0 | 0 |
| AIBN |  |  | 2.5 | 2.5 | 2.5 | 2.5 | 2.5 | 2.5 | 2.5 | 2.5 |
| AMBN |  |  | 5 | 5 | 6 | 6.5 | 3 | 6 | 8 | 8 |
| Solvent (S) | n-Butanol |  | 15 | 15 | 15 | 15 | 15 | 15 | 15 | 15 |
|  | Xylene |  | 35 | 35 | 32.3 | 35 | 70 | 35 | 35 | 29.5 |
| NOFMER MSD |  |  | 1.2 | 1.2 | 1.2 | 1.2 | 1.2 | 1.2 | 1.2 | 1.2 |
| Polymer-containing composition ((meth)acryl-based copolymer (A)) | Solid content | % by mass | 56.4 | 56.1 | 56.2 | 56.2 | 46.9 | 55.3 | 60.4 | 55.4 |
|  | Viscosity |  | OP | +S | S | TU | Q | RS | V | TU |
|  | Acid value | mgKOH/g | 84 | 84 | 95 | 84 | 84 | 84 | 84 | 105 |
|  | Mw |  | 3800 | 3800 | 4200 | 3700 | 6100 | 3700 | 3200 | 3500 |
|  | Mn |  | 1400 | 1400 | 1400 | 1300 | 1800 | 1300 | 1200 | 1200 |
|  | SP value | $(cal/cm^3)^{1/2}$ | 9.9 | 10.1 | 10.1 | 10.6 | 9.7 | 11.1 | 11.2 | 11.2 |
| Physical properties of coating film | Coating film condition after test for self-polishing properties |  | A | A | A | B | C2 | C1 | C1 | C1 |
|  | Coating film hardness | N/mm² | 3.3 | 3.2 | 4.0 | 4.2 | 8.0 | 2.4 | 2.2 | 1.8 |

The coating films of the polymer-containing compositions of Examples B1 to B12 were in a good condition after the test for self-polishing properties and had good hardness.

The polymer-containing composition of Comparative Example B1 in which the weight-average molecular weight of the (meth)acryl-based copolymer (A) was greater than 5,000 had excessively high viscosity. Therefore, the solid content of the polymer-containing composition could not be further increased.

The coating films of the polymer-containing compositions of Comparative Examples B2, B3, and B4 had a molecular weight which was within the range of the present application and low viscosity. However, the coating films had a high SP value and became defective after the test for self-polishing properties. Furthermore, the coating film hardness was poor.

Examples B51 to B66 and Comparative Examples B51 to B54 (Manufacturing of Antifouling Coating Composition)

By using the polymer-containing compositions (bA-1 to bA-16, 63.9 parts by mass), components were put into a metallic can according to the formulation shown in Table 5 and Table 6. Then, glass beads were added thereto, and the components were premixed together by using a stirring rod. The obtained mixture was subjected to pigment dispersion by using a rocking shaker, thereby obtaining antifouling coating compositions. Here, in Comparative Example B1, 78.1 parts by mass of the polymer-containing composition was used, and in Comparative Example B3, 58.6 parts by mass of the polymer-containing composition was used.

Table 5 and Table 6 show the evaluation results of the coating films formed using the obtained antifouling coating compositions.

TABLE 5

|  |  |  | Example | | | | | | | | | |
|---|---|---|---|---|---|---|---|---|---|---|---|---|
|  |  |  | B51 | B52 | B53 | B54 | B55 | B56 | B57 | B58 | B59 | B60 |
| Polymer-containing composition |  |  | bA-1 | bA-2 | bA-3 | bA-4 | bA-5 | bA-6 | bA-7 | bA-8 | bA-3 | bA-3 |
| Pigment | Talc | Part | 19.05 | 19.05 | 19.05 | 19.05 | 19.05 | 19.05 | 19.05 | 19.05 | 19.05 | 0 |
|  | Zinc oxide | by | 42.9 | 42.9 | 42.9 | 42.9 | 42.9 | 42.9 | 42.9 | 42.9 | 42.9 | 34.05 |
| antifouling agent | Antifouling agent (1) | mass | 4.5 | 4.5 | 4.5 | 4.5 | 4.5 | 4.5 | 4.5 | 4.5 | 3.5 | 2 |
|  | Medetomidine |  | 0 | 0 | 0 | 0 | 0 | 0 | 0 | 0 | 1 | 0 |
|  | Cuprous oxide |  | 0 | 0 | 0 | 0 | 0 | 0 | 0 | 0 | 0 | 40 |
|  | Zinc pyrithione |  | 3 | 3 | 3 | 3 | 3 | 3 | 3 | 3 | 3 | 0 |
|  | Copper pyrithione |  | 0 | 0 | 0 | 0 | 0 | 0 | 0 | 0 | 0 | 3 |
|  | Pyridine-triphenylborane |  | 0 | 0 | 0 | 0 | 0 | 0 | 0 | 0 | 0 | 0 |
| Thermoplastic resin | Additive (1) |  | 3 | 3 | 3 | 3 | 3 | 3 | 3 | 3 | 3 | 3 |
|  | Additive (2) |  | 4 | 4 | 4 | 4 | 4 | 4 | 4 | 4 | 4 | 4 |
| Additive | Additive (3) |  | 0 | 0 | 0 | 0 | 0 | 0 | 0 | 0 | 0 | 1 |

TABLE 5-continued

| | | | \multicolumn{10}{c}{Example} |
| | | | B51 | B52 | B53 | B54 | B55 | B56 | B57 | B58 | B59 | B60 |
|---|---|---|---|---|---|---|---|---|---|---|---|---|
| Solvent | Xylene | | 8.25 | 8.25 | 8.25 | 8.25 | 8.25 | 8.25 | 8.25 | 8.25 | 8.25 | 5 |
| Antifouling coating composition | Solid content | % by mass | 73.4 | 72.8 | 73.3 | 73.8 | 74.4 | 73.3 | 73.3 | 73.4 | 73.2 | 73.3 |
| | Viscosity | mPa·s | 1.8 | 1.5 | 1.5 | 2.5 | 2.2 | 1.6 | 1.5 | 1.8 | 1.5 | 1.8 |
| Physical properties of coating film | Wear degree | μm/M | 2.4 | 2.2 | 2.0 | 1.8 | 1.5 | 1.6 | 1.6 | 2.4 | 2.0 | 1.5 |

TABLE 6

| | | | \multicolumn{6}{c}{Example} | \multicolumn{4}{c}{Comparative Example} |
| | | | B61 | B62 | B63 | B64 | B65 | B66 | B51 | B52 | B53 | B54 |
|---|---|---|---|---|---|---|---|---|---|---|---|---|
| Polymer-containing composition | | | bA-3 | bA-3 | bA-12 | bA-13 | bA-14 | bA-15 | bA-9 | bA-10 | bA-11 | bA-16 |
| Pigment | Talc | Part by mass | 19.05 | 19.05 | 19.05 | 19.05 | 19.05 | 19.05 | 19.05 | 19.05 | 19.05 | 19.05 |
| | Zinc oxide | | 42.9 | 42.9 | 42.9 | 42.9 | 42.9 | 42.9 | 42.9 | 42.9 | 42.9 | 42.9 |
| Antifouling agent | Antifouling agent (1) | | 0 | 4.5 | 4.5 | 4.5 | 4.5 | 4.5 | 4.5 | 4.5 | 4.5 | 4.5 |
| | Medetomidine | | 1 | 0 | 0 | 0 | 0 | 0 | 0 | 0 | 0 | 0 |
| | Cuprous oxide | | 0 | 0 | 0 | 0 | 0 | 0 | 0 | 0 | 0 | 0 |
| | Zinc pyrithione | | 3 | 3 | 3 | 3 | 3 | 3 | 3 | 3 | 3 | 3 |
| | Copper pyrithione | | 0 | 0 | 0 | 0 | 0 | 0 | 0 | 0 | 0 | 0 |
| | Pyridine-triphenylborane | | 4.5 | 0 | 0 | 0 | 0 | 0 | 0 | 0 | 0 | 0 |
| Thermoplastic resin | Additive (1) | | 3 | 3 | 3 | 3 | 3 | 3 | 3 | 3 | 3 | 3 |
| | Additive (2) | | 4 | 4 | 4 | 4 | 4 | 4 | 4 | 4 | 4 | 4 |
| Additive | Additive (3) | | 0 | 0 | 0 | 0 | 0 | 0 | 0 | 0 | 0 | 0 |
| Solvent | Xylene | | 8.25 | 3 | 8.25 | 8.25 | 8.25 | 8.25 | 8.25 | 8.25 | 8.25 | 8.25 |
| Antifouling coating composition | Solid content | % By mass | 73.1 | 73.3 | 74.4 | 73.1 | 73.4 | 73.8 | 68.0 | 73.3 | 73.3 | 73.8 |
| | Viscosity | mPa·s | 1.7 | 2.8 | 1.8 | 1.7 | 1.7 | 1.7 | 2.6 | 1.8 | 1.8 | 1.7 |
| Physical properties of coating film | Wear degree | μm/M | 1.8 | 2.0 | 1.9 | 2.1 | 3.3 | 2.4 | 0.6 | 5.3 | 5.0 | 6.2 |

Each of the abbreviations used in Table 5 and Table 6 means the following component.

Antifouling Agent (1):
4-bromo-2-(4-chlorophenyl)-5-(trifluoromethyl)-1H-pyrrole-3-carbonitrile Additive (1): TOYOPARAX 150 (manufactured by Tosoh Corporation, chlorinated paraffin)

Additive (2): DISPARLON 4200-20 (manufactured by Kusuinoto Chemicals, Ltd., oxidized polyethylene wax)

Additive (3): KF-96 (manufactured by Shin-Etsu Chemical Co., Ltd., silicone oil)

The antifouling coating compositions of Example B51 to B66 had appropriate viscosity and an appropriate coating film wear rate. Furthermore, the solid content of the antifouling coating compositions could be increased.

The antifouling coating composition of Comparative Example B51 had a low coating film wear degree and demonstrated a poor antifouling performance. Furthermore, because the viscosity of the antifouling coating composition was excessively high, the solid content thereof could not be further increased. The antifouling coating compositions of Comparative Examples B52 to B54 formed coating films having a high wear degree, and the coating films were completely worn after a long period of time. Therefore, the long-term antifouling properties thereof were poor. In addition, the coating film hardness of the polymer-containing compositions (bA-10), (bA-11), and (bA-16) corresponding to the antifouling coating compositions of Comparative Examples B52 to B54 was low. Therefore, it can be concluded that the coating film hardness of the antifouling coating compositions of Comparative Examples B2, B3, and B4 is also low.

INDUSTRIAL APPLICABILITY

According to the present invention, it is possible to provide an antifouling coating composition, which can form a coating film having good hardness and good physical properties and a wear degree appropriate for expressing a long-term antifouling effect, has viscosity not being excessively high, and makes it possible to reduce a VOC content, and a polymer-containing composition which is suitable for obtaining the antifouling coating composition.

Therefore, the present invention can be suitably used in the field of antifouling coating compositions with which marine structures will be coated.

The invention claimed is:

1. A polymer-containing composition comprising:
   a (meth)acryl-based copolymer (A-1) having an acid value equal to or higher than 35 mgKOH/g,
   wherein the (meth)acryl-based copolymer (A-1) contains a constitutional unit (U11) represented by Formula (11), a constitutional unit (U12) represented by Formula (12), or both,
   and has a weight-average molecular weight of 1,000 to 5,000, and
   a vinyl-based polymer (B), wherein the vinyl-based polymer (B) has an acid value less than 25 mgKOH/g and has a number-average molecular weight of 2,000 to 20,000, and wherein a coating film hardness of the polymer-containing composition is equal to or higher than 2.5 N/mm², $$—(C=O)—O—M—O—(C=O)— \qquad (11)$$

$$—(C=O)—O—M—R^{32} \qquad (12)$$

wherein $R^{32}$ represents an organic acid residue, and M represents a divalent metal atom.

2. The polymer-containing composition according to claim 1,
wherein a Tg of the vinyl-based polymer (B) is equal to or higher than 20° C.

3. The polymer-containing composition according to claim 1,
wherein a ratio of the (meth)acryl-based copolymer (A-1): the vinyl-based polymer (B) contained in the polymer-containing composition is 98:2 to 70:30.

4. The polymer-containing composition according to claim 1,
wherein a solubility parameter of the polymer-containing composition is less than 11.1 (cal/cm³)^{1/2}.

5. The polymer-containing composition according to claim 1,
wherein the (meth)acryl-based copolymer (A-1) contains a constitutional unit (U3) in addition to the constitutional unit (U11), the constitutional unit (U12), or both, and
the constitutional unit (U3) contains a constitutional unit derived from a monomer (u3-1) having an alicyclic functional group.

6. The polymer-containing composition according to claim 5,
wherein a constitutional unit whose proportion in the constitutional unit (U3) is equal to or higher than 30% by mass is derived from a monomer whose corresponding homopolymer has a Tg equal to or higher than 50° C.

7. The polymer-containing composition according to claim 1,
wherein a Gardner viscosity of the polymer-containing composition is equal to or lower than Z at a solid content of 55% by mass.

8. An antifouling coating composition comprising:
the polymer-containing composition according to claim 1.

9. The antifouling coating composition according to claim 8, further comprising:
an antifouling agent.

10. The antifouling coating composition according to claim 9,
wherein the antifouling agent is one or more compounds selected from the group consisting of cuprous oxide, 4-bromo-2-(4-chlorophenyl)-5-(trifluoromethyl)-1H-pyrrole-3-carbonitrile, pyridine-triphenylborane, zinc pyrithione, copper pyrithione, and medetomidine.

11. The antifouling coating composition according to claim 8, further comprising:
a thermoplastic resin other than the (meth)acryl-based copolymer (A-1), a (meth)acryl-based copolymer (A-2), or the vinyl-based polymer (B), wherein the (meth)acryl-based copolymer (A-2) contains the constitutional unit (U11) represented by Formula (11), the constitutional unit (U12) represented by Formula (12), or both, and has a weight-average molecular weight of 1,000 to 5,000, the (meth)acryl-based copolymer (A-2) contains a constitutional unit (U3) in addition to the constitutional unit (U11), the constitutional unit (U12), or both, the constitutional unit (U3) contains a constitutional unit derived from a monomer (u3-1) having an alicyclic functional group, and a constitutional unit whose proportion in the constitutional unit (U3) is equal to or higher than 30% by mass is derived from a monomer whose corresponding homopolymer has a Tg equal to or higher than 50° C.

12. The antifouling coating composition according to claim 8,
wherein a coating material solid content of the antifouling coating composition is equal to or greater than 60% by mass.

13. A polymer-containing composition comprising:
a (meth)acryl-based copolymer (A-1),
wherein the (meth)acryl-based copolymer (A-1) contains a constitutional unit (U11) represented by Formula (11), a constitutional unit (U12) represented by Formula (12), or both, and has a weight-average molecular weight of 1,000 to 5,000,
a solubility parameter of the polymer-containing composition is less than 11.1 (cal/cm³)^{1/2}, and
a coating film hardness of the polymer-containing composition is equal to or higher than 2.5 N/mm², $$—(C=O)—O—M—O—(C=O)— \qquad (11)$$

$$—(C=O)—O—M—R^{32} \qquad (12)$$

wherein $R^{32}$ represents an organic acid residue, and M represents a divalent metal atom.

14. The polymer-containing composition according to claim 13,
wherein the (meth)acryl-based copolymer (A-1) contains a constitutional unit (U3) in addition to the constitutional unit (U11), the constitutional unit (U12), or both, and
the constitutional unit (U3) contains a constitutional unit derived from a monomer (u3-1) having an alicyclic functional group.

15. The polymer-containing composition according to claim 14,
wherein a constitutional unit whose proportion in the constitutional unit (U3) is equal to or higher than 30% by mass is derived from a monomer whose corresponding homopolymer has a Tg equal to or higher than 50° C.

16. An antifouling coating composition comprising:
the polymer-containing composition according to claim 13.

17. The antifouling coating composition according to claim 16, further comprising:
an antifouling agent.

* * * * *